US012579680B2

(12) United States Patent
Wang et al.

(10) Patent No.: US 12,579,680 B2
(45) Date of Patent: Mar. 17, 2026

(54) IMAGE PROCESSING METHOD AND APPARATUS, ELECTRONIC DEVICE, AND STORAGE MEDIUM

(71) Applicant: Beijing Zitiao Network Technology Co., Ltd., Beijing (CN)

(72) Inventors: Siyuan Wang, Beijing (CN); Yitong Li, Beijing (CN); Liyou Xu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 422 days.

(21) Appl. No.: 18/022,455

(22) PCT Filed: Nov. 3, 2022

(86) PCT No.: PCT/CN2022/129443
§ 371 (c)(1),
(2) Date: Feb. 21, 2023

(87) PCT Pub. No.: WO2024/007496
PCT Pub. Date: Jan. 11, 2024

(65) Prior Publication Data
US 2024/0193804 A1     Jun. 13, 2024

(30) Foreign Application Priority Data

Jul. 6, 2022     (CN) .......................... 202210797502.6

(51) Int. Cl.
*G06T 7/73*          (2017.01)
*G06T 7/33*          (2017.01)
(52) U.S. Cl.
CPC .................. *G06T 7/73* (2017.01); *G06T 7/33* (2017.01); *G06T 2207/20044* (2013.01); *G06T 2207/30196* (2013.01)

(58) Field of Classification Search
CPC ... G06T 7/73; G06T 7/33; G06T 2207/20044; G06T 2207/30196; G06T 13/40; G06T 2207/10016; G06T 7/344; G06T 7/75
See application file for complete search history.

(56) References Cited

U.S. PATENT DOCUMENTS

2009/0262118 A1     10/2009   Arikan et al.
2020/0342218 A1 *   10/2020   Shin ......................... G06T 7/75
(Continued)

FOREIGN PATENT DOCUMENTS

CN          106709976  A  *  5/2017   ............. G06T 13/80
CN          108876815  A     11/2018
(Continued)

OTHER PUBLICATIONS

Aberman et al., "Skeleton-aware networks for deep motion retargeting", ACM Transactions on Graphics (TOG), vol. 39, No. 4, Jul. 8, 2020, 14 pages.
(Continued)

*Primary Examiner* — Jennifer Mehmood
*Assistant Examiner* — Vaisali Rao Koppolu
(74) *Attorney, Agent, or Firm* — Astute IP Law Group

(57) ABSTRACT

Provided are an image processing method and apparatus, an electronic device, and a storage medium. The method includes determining a to-be-registered skeleton chain and a preset skeleton chain of a target part in a to-be-processed video frame; determining wrist or ankle state information of the to-be-registered wrist or ankle skeleton point according to first pose information of the to-be-registered wrist or ankle skeleton point and second pose information of the preset wrist or ankle skeleton point; determining finger or toe state information of the to-be-registered finger or toe skeleton point according to the wrist or ankle state information, third pose information of the to-be-registered finger
(Continued)

Determine a to-be-registered skeleton chain and a preset skeleton chain of a target part in a to-be-processed video frame ~S110

Determine wrist or ankle state information of the to-be-registered wrist or ankle skeleton point according to first pose information of the to-be-registered wrist or ankle skeleton point and second pose information of the preset wrist or ankle skeleton point ~S120

Determine finger or toe state information of the to-be-registered finger or toe skeleton point according to the wrist or ankle state information, third pose information of the to-be-registered finger or toe skeleton point, and fourth pose information of the preset finger or toe skeleton point ~S130

Display the target part in the to-be-processed video frame according to the wrist or ankle state information and the finger or toe state information ~S140 or toe skeleton point, and fourth pose information of the preset finger or toe skeleton point; and displaying the target part in the to-be-processed video frame according to the wrist or ankle state information and the finger or toe state information.

19 Claims, 7 Drawing Sheets

(56) References Cited

U.S. PATENT DOCUMENTS

| | | | |
|---|---|---|---|
| 2021/0295580 A1 | 9/2021 | Ohashi | |
| 2022/0157022 A1* | 5/2022 | Baek | G06T 19/003 |
| 2022/0215564 A1* | 7/2022 | Sunarjo | G06T 19/20 |
| 2025/0139885 A1* | 5/2025 | Zhang | G06T 15/00 |

FOREIGN PATENT DOCUMENTS

| | | |
|---|---|---|
| CN | 111127606 A | 5/2020 |
| CN | 111223171 A | 6/2020 |
| CN | 111369647 A | 7/2020 |
| CN | 112927331 A | 6/2021 |
| CN | 112950751 A | 6/2021 |
| CN | 113793409 A | 12/2021 |
| CN | 114299200 A | 4/2022 |
| CN | 115082604 A | 9/2022 |
| EP | 3860810 A1 | 8/2021 |

OTHER PUBLICATIONS

Elkoura et al., "Handrix: Animating the Human Hand", SCA '03: Proceedings of the 2003 ACM SIGGRAPH/Eurographics symposium on Computer animation, Jul. 26, 2003, 11 pages.

Ge et al., Motion Retargeting for the Hand Gesture, 13th International Conference in Central Europe on Computer Graphics, Visualization and Computer Vision' 2005, WSCG 2005, Jan. 31, 2005, 7 pages.

Supplementary European Search Report for European Patent Application No. 22854407.8, mailed May 10, 2024, 5 pages.

Orbik et al., "Human hand motion retargeting for dexterous robotic hand", 2021 18th International Conference on Ubiquitous Robots (UR), IEEE, Jul. 12, 2021, 7 pages.

Xie et al., "Automatic Heterogeneous Motion Retargeting Using Semantic Inter-mediate Skeleton", Journal of Computer-Aided Design & Computer Graphics, vol. 28, No. 5, May 15, 2016, 13 pages, with English Abstract.

Chen et al., "Design of 2D Character Action Based on Flash Skeleton Tool", Beauty and Times, vol. 1, No. 09, Sep. 15, 2012, 9 pages.

Office Action for Chinese Patent Application No. 202210797502.6, mailed on Jan. 17, 2025, 24 pages.

International Search Report in PCT/CN2022/129443, mailed Mar. 22, 2023, 4 pages.

Search Report received for Chinese Application No. 202210797502.6, mailed on Aug. 18, 2025, 4 pages (2 pages of English Translation and 2 pages of Original Document).

* cited by examiner

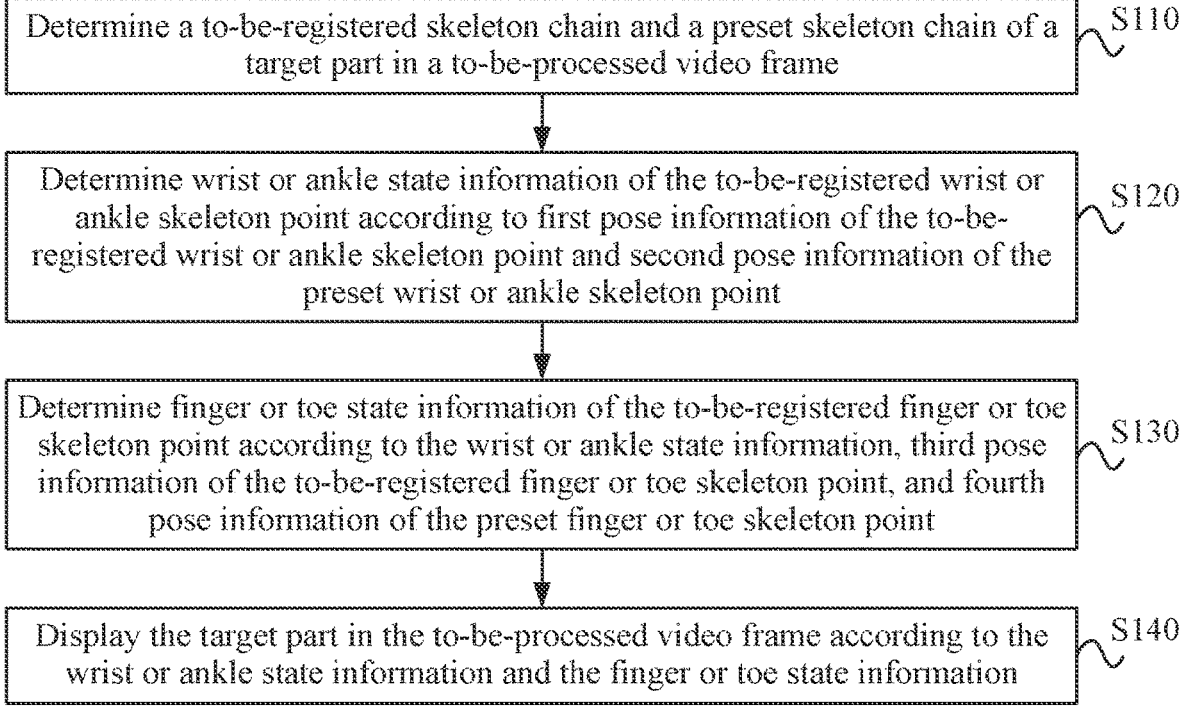

| Determine a to-be-registered skeleton chain and a preset skeleton chain of a target part in a to-be-processed video frame | S110 |

Determine wrist or ankle state information of the to-be-registered wrist or ankle skeleton point according to first pose information of the to-be-registered wrist or ankle skeleton point and second pose information of the preset wrist or ankle skeleton point — S120

Determine finger or toe state information of the to-be-registered finger or toe skeleton point according to the wrist or ankle state information, third pose information of the to-be-registered finger or toe skeleton point, and fourth pose information of the preset finger or toe skeleton point — S130

Display the target part in the to-be-processed video frame according to the wrist or ankle state information and the finger or toe state information — S140

FIG. 1

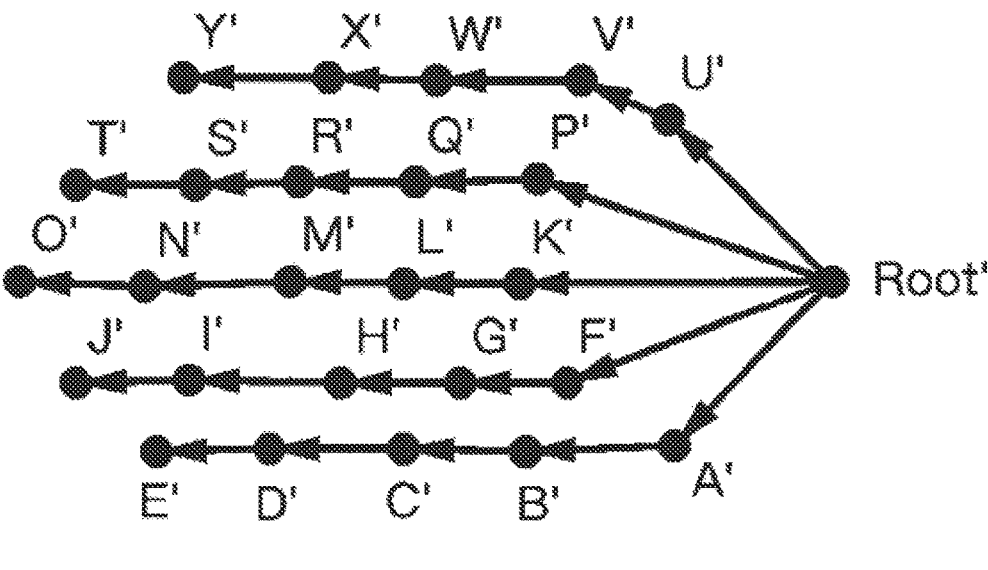

FIG. 2

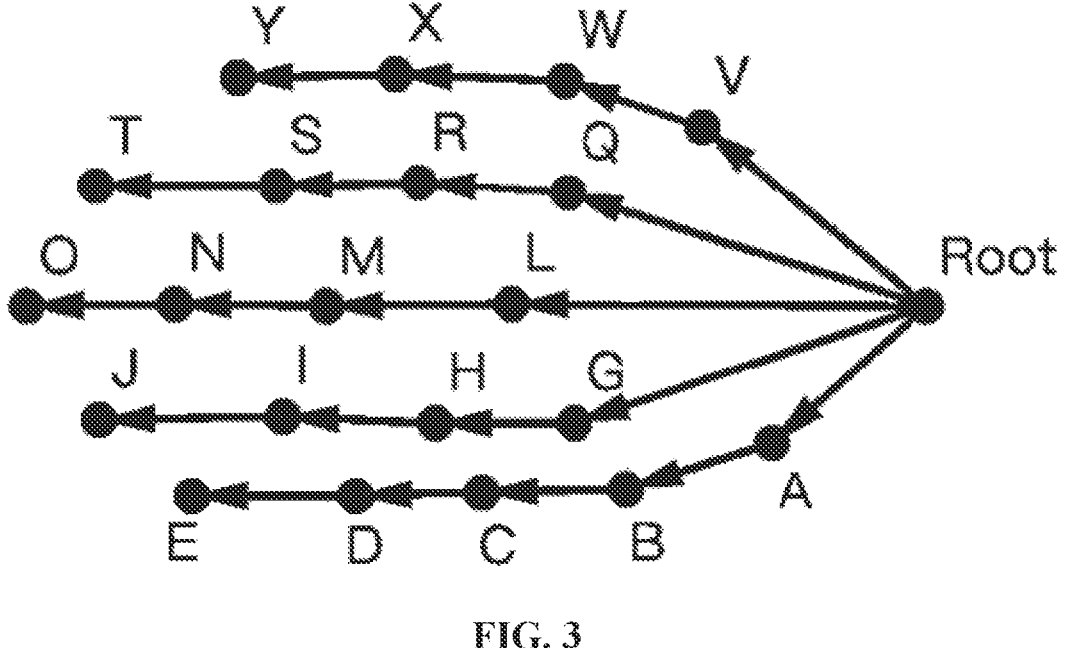
FIG. 3
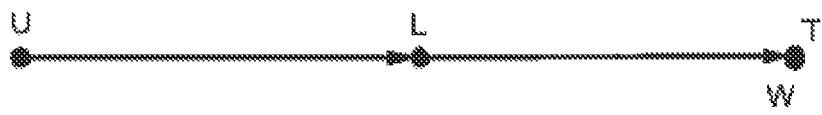
FIG. 4

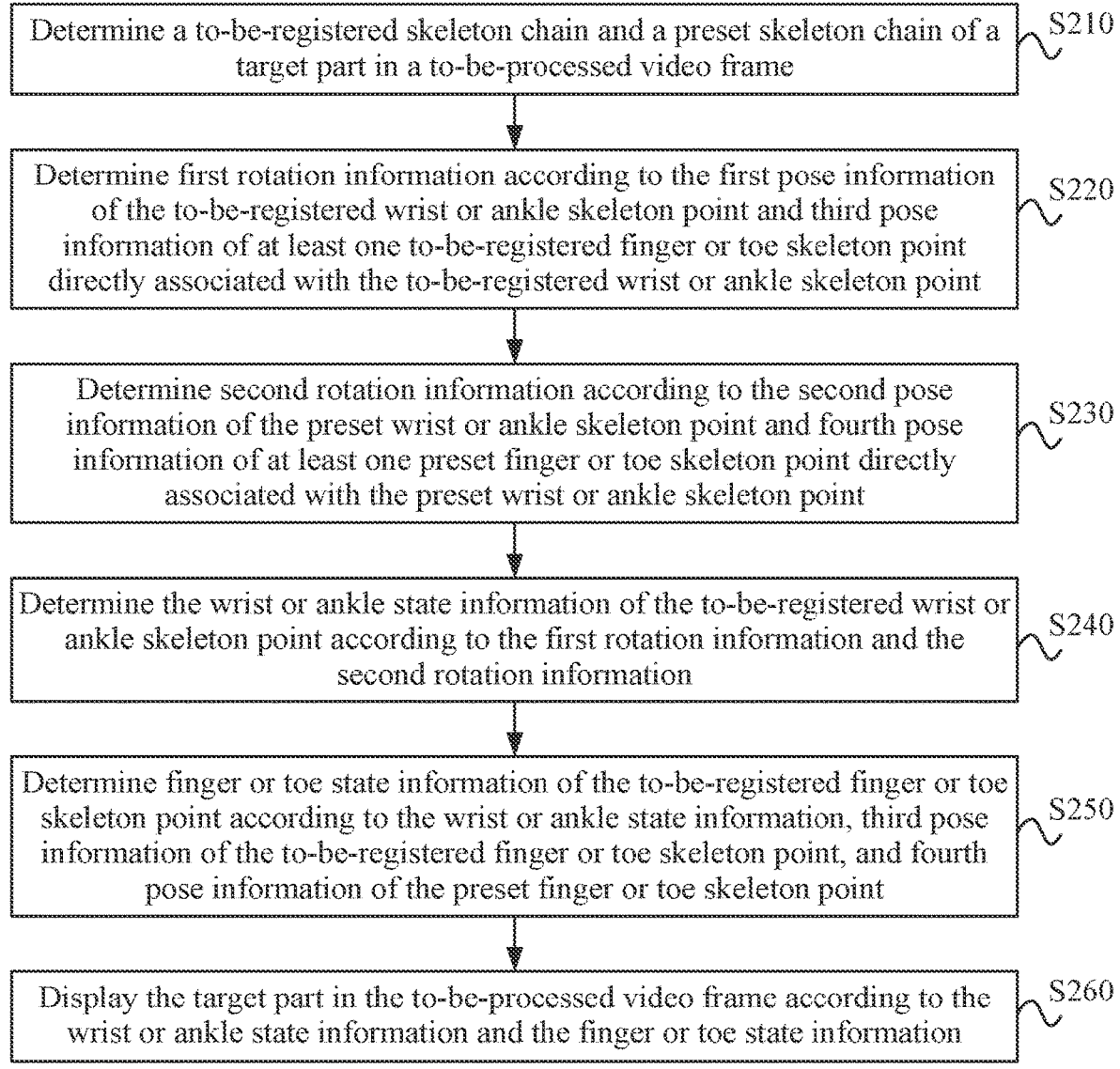

Determine a to-be-registered skeleton chain and a preset skeleton chain of a target part in a to-be-processed video frame ~S210

Determine first rotation information according to the first pose information of the to-be-registered wrist or ankle skeleton point and third pose information of at least one to-be-registered finger or toe skeleton point directly associated with the to-be-registered wrist or ankle skeleton point ~S220

Determine second rotation information according to the second pose information of the preset wrist or ankle skeleton point and fourth pose information of at least one preset finger or toe skeleton point directly associated with the preset wrist or ankle skeleton point ~S230

Determine the wrist or ankle state information of the to-be-registered wrist or ankle skeleton point according to the first rotation information and the second rotation information ~S240

Determine finger or toe state information of the to-be-registered finger or toe skeleton point according to the wrist or ankle state information, third pose information of the to-be-registered finger or toe skeleton point, and fourth pose information of the preset finger or toe skeleton point ~S250

Display the target part in the to-be-processed video frame according to the wrist or ankle state information and the finger or toe state information ~S260

FIG. 5

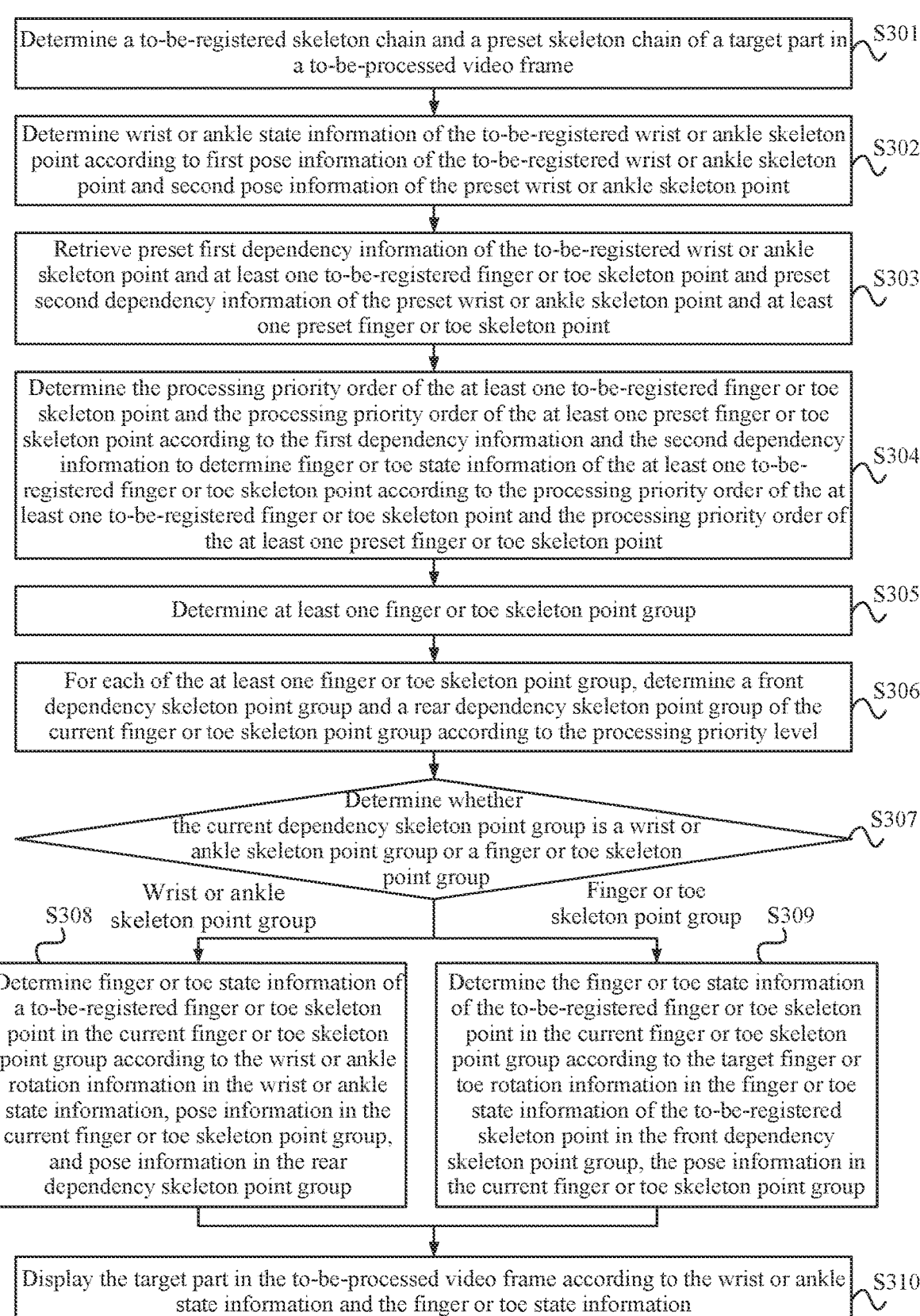

Determine a to-be-registered skeleton chain and a preset skeleton chain of a target part in a to-be-processed video frame ~S301

Determine wrist or ankle state information of the to-be-registered wrist or ankle skeleton point according to first pose information of the to-be-registered wrist or ankle skeleton point and second pose information of the preset wrist or ankle skeleton point ~S302

Retrieve preset first dependency information of the to-be-registered wrist or ankle skeleton point and at least one to-be-registered finger or toe skeleton point and preset second dependency information of the preset wrist or ankle skeleton point and at least one preset finger or toe skeleton point ~S303

Determine the processing priority order of the at least one to-be-registered finger or toe skeleton point and the processing priority order of the at least one preset finger or toe skeleton point according to the first dependency information and the second dependency information to determine finger or toe state information of the at least one to-be-registered finger or toe skeleton point according to the processing priority order of the at least one to-be-registered finger or toe skeleton point and the processing priority order of the at least one preset finger or toe skeleton point ~S304

Determine at least one finger or toe skeleton point group ~S305

For each of the at least one finger or toe skeleton point group, determine a front dependency skeleton point group and a rear dependency skeleton point group of the current finger or toe skeleton point group according to the processing priority level ~S306

Determine whether the current dependency skeleton point group is a wrist or ankle skeleton point group or a finger or toe skeleton point group ~S307

Wrist or ankle skeleton point group  S308

Finger or toe skeleton point group  S309

Determine finger or toe state information of a to-be-registered finger or toe skeleton point in the current finger or toe skeleton point group according to the wrist or ankle rotation information in the wrist or ankle state information, pose information in the current finger or toe skeleton point group, and pose information in the rear dependency skeleton point group Determine the finger or toe state information of the to-be-registered finger or toe skeleton point in the current finger or toe skeleton point group according to the target finger or toe rotation information in the finger or toe state information of the to-be-registered skeleton point in the front dependency skeleton point group, the pose information in the current finger or toe skeleton point group Display the target part in the to-be-processed video frame according to the wrist or ankle state information and the finger or toe state information ~S310

FIG. 8

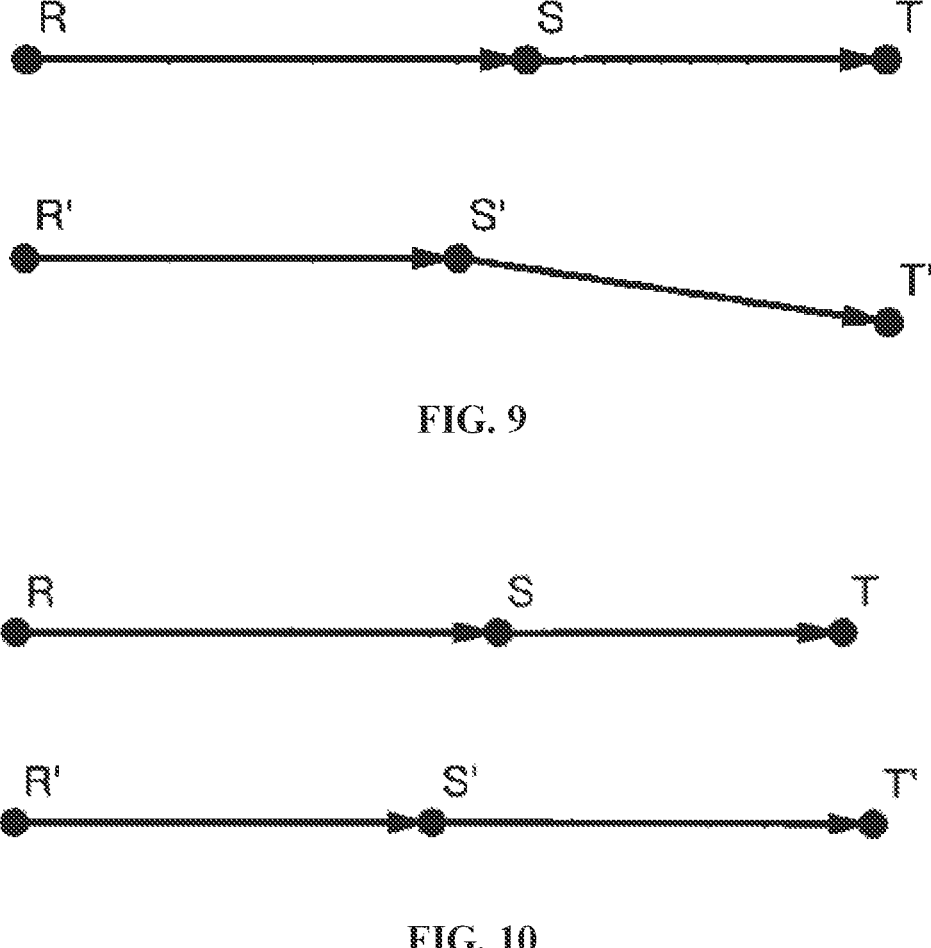
FIG. 9
FIG. 10
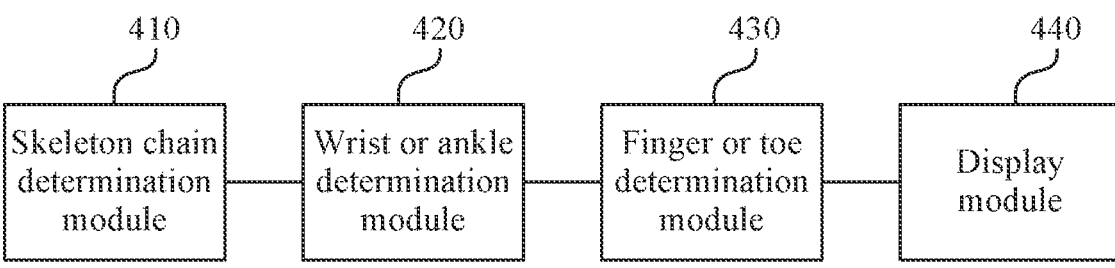
| Skeleton chain determination module | Wrist or ankle determination module | Finger or toe determination module | Display module |
|---|---|---|---|
| 410 | 420 | 430 | 440 |
FIG. 11

IMAGE PROCESSING METHOD AND APPARATUS, ELECTRONIC DEVICE, AND STORAGE MEDIUM

CROSS-REFERENCE TO RELATED APPLICATIONS

This application is a national stage application filed under 35 U.S.C. 371 based on International Patent Application No. PCT/CN2022/129443, filed on Nov. 3, 2022, which claims priority to Chinese Patent Application No. 202210797502.6 filed with the China National Intellectual Property Administration (CNIPA) on Jul. 6, 2022, the disclosures of which is are incorporated herein by reference in their entireties.

TECHNICAL FIELD

Embodiments of the present disclosure relate to image processing techniques, for example, an image processing method and apparatus, an electronic device, and a storage medium.

BACKGROUND

Either animation retargeting or artificial intelligence body recognition may require migration of animation data from one skeleton model to another skeleton model for the display purpose.

In the case where the two skeleton models are much different in terms of, for example, size or posture, noticeable "clipping through" occurs in a display image after the migration. This problem is particularly evident for a skeleton model having a relatively large number of skeleton points, leading to poor animation display and poor verisimilitude and even affecting the user experience.

SUMMARY

The present disclosure provides an image processing method and apparatus, an electronic device, and a storage medium to improve the verisimilitude of a target part displayed in a display interface without "clipping through" to improve the user experience.

In a first aspect, an embodiment of the present disclosure provides an image processing method. The method includes determining a to-be-registered skeleton chain and a preset skeleton chain of a target part in a to-be-processed video frame, where the to-be-registered skeleton chain includes a to-be-registered wrist or ankle skeleton point and a to-be-registered finger or toe skeleton point, and the preset skeleton chain includes a preset wrist or ankle skeleton point and a preset finger or toe skeleton point: determining wrist or ankle state information of the to-be-registered wrist or ankle skeleton point according to first pose information of the to-be-registered wrist or ankle skeleton point and second pose information of the preset wrist or ankle skeleton point, where the wrist or ankle state information includes wrist or ankle rotation information and wrist or ankle pose information: determining finger or toe state information of the to-be-registered finger or toe skeleton point according to the wrist or ankle state information, third pose information of the to-be-registered finger or toe skeleton point, and fourth pose information of the preset finger or toe skeleton point, where the finger or toe state information includes finger or toe rotation information and finger or toe pose information: and displaying the target part in the to-be-processed video frame according to the wrist or ankle state information and the finger or toe state information.

In a second aspect, an embodiment of the present disclosure provides an image processing apparatus. The apparatus includes a skeleton chain determination module, a wrist or ankle determination module, a finger or toe determination module, and a display module.

The skeleton chain determination module is configured to determine a to-be-registered skeleton chain and a preset skeleton chain of a target part in a to-be-processed video frame, where the to-be-registered skeleton chain includes a to-be-registered wrist or ankle skeleton point and a to-be-registered finger or toe skeleton point, and the preset skeleton chain includes a preset wrist or ankle skeleton point and a preset finger or toe skeleton point.

The wrist or ankle determination module is configured to determine wrist or ankle state information of the to-be-registered wrist or ankle skeleton point according to first pose information of the to-be-registered wrist or ankle skeleton point and second pose information of the preset wrist or ankle skeleton point, where the wrist or ankle state information includes wrist or ankle rotation information and wrist or ankle pose information.

The finger or toe determination module is configured to determine finger or toe state information of the to-be-registered finger or toe skeleton point according to the wrist or ankle state information, third pose information of the to-be-registered finger or toe skeleton point, and fourth pose information of the preset finger or toe skeleton point, where the finger or toe state information includes finger or toe rotation information and finger or toe pose information.

The display module is configured to display the target part in the to-be-processed video frame according to the wrist or ankle state information and the finger or toe state information.

In a third aspect, an embodiment of the present disclosure provides an electronic device. The electronic device includes one or more processors: and a storage apparatus configured to store one or more programs.

The one or more programs are configured to, when executed by the one or more programs, cause the one or more processors to perform the image processing method of any one of embodiments of the present disclosure.

In a fourth aspect, an embodiment of the present disclosure provides a storage medium storing computer-executable instructions. When executed by a computer processor, the instructions cause the computer processor to perform the image processing method of any embodiment of the present disclosure.

BRIEF DESCRIPTION OF DRAWINGS

Same or similar reference numerals in the drawings denote same or similar elements. It is to be understood that the drawings are illustrative and that originals and elements are not necessarily drawn to scale.

FIG. 1 is a flowchart of an image processing method according to an embodiment of the present disclosure.

FIG. 2 is a diagram of a to-be-registered skeleton chain according to an embodiment of the present disclosure.

FIG. 3 is a diagram of a preset skeleton chain according to an embodiment of the present disclosure.

FIG. 4 is a diagram illustrating an adjustment of an arm skeleton chain according to an embodiment of the present disclosure.

FIG. 5 is a flowchart of another image processing method according to an embodiment of the present disclosure.

FIG. 8 is a flowchart of another image processing method according to an embodiment of the present disclosure.

FIG. 9 is a diagram of a to-be-registered finger or toe skeleton point before rotation according to an embodiment of the present disclosure.

FIG. 10 is a diagram of a to-be-registered finger or toe skeleton point after rotation according to an embodiment of the present disclosure.

FIG. 11 is a block diagram of an image processing apparatus according to an embodiment of the present disclosure.

DETAILED DESCRIPTION

Figure 6:
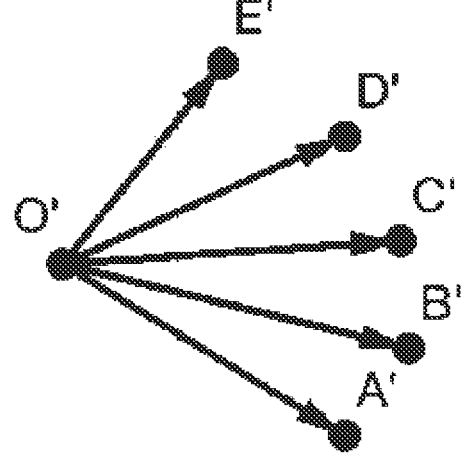
FIG. 6 is a diagram of a to-be-registered wrist or ankle skeleton point and at least one to-be-registered finger or toe skeleton point directly associated with the to-be-registered wrist or ankle skeleton point according to an embodiment of the present disclosure.

It is to be understood that steps described in method embodiments of the present disclosure may be performed in sequence and/or in parallel. Additionally, the method embodiments may include additional steps and/or omit the steps shown. The scope of the present disclosure is not limited in this respect.

The term "includes" or its variant used herein means "includes, but is not limited to". The term "based on" used herein means "at least partially based on". The term "an embodiment" used herein means "at least one embodiment". The term "another embodiment" used herein means "at least another embodiment". The term "some embodiments" used herein means "at least some embodiments". Related definitions of other terms are given in the description hereinafter.

It is to be noted that concepts such as "first" and "second" used herein are intended to distinguish between apparatuses, modules or units and not to limit the order of or dependency between functions performed by the apparatuses, modules or units.

It is to be noted that "one" or "multiple" in the present disclosure is illustrative and non-limiting and that those skilled in the art should understand that "one" or "multiple" is interpreted as "one or more" unless otherwise specified in the context.

Names of messages or information exchanged between apparatuses in embodiments of the present disclosure are illustrative and not to limit the scope of the messages or information.

It is to be understood that the type, use range, and use scenarios of personal information involved in the present disclosure should be notified to and authorized by a user appropriately according to relevant laws and regulations before solutions of embodiments of the present disclosure are used.

For example, in response to receiving an active request from a user, prompt information is sent to the user to explicitly remind the user that the requested operation requires acquisition and use of personal information of the user. Accordingly, the user can autonomously choose, according to the prompt information, whether to provide personal information for software or hardware, such as an electronic device, an application program, a server, or a storage medium, for executing operations of solutions of the present disclosure.

In an illustrative and non-limiting embodiment, in response to receiving the active request from the user, the manner in which the prompt information is sent to the user may be, for example, in the form of a pop-up window in which the prompt information may be presented in text. Additionally, the pop-up window may also carry a selection control for the user to select "agree" or "disagree" to determine whether to provide personal information for the electronic device.

It is to be understood that the preceding process of notifying the user and getting authorization from the user is illustrative and does not limit embodiments of the present disclosure and that other manners complying with relevant laws and regulations may also be applied to embodiments of the present disclosure.

It is to be understood that data (including, but not limited to, the data itself and acquisition or use of the data) involved in the solutions should comply with corresponding laws and regulations and relevant provisions.

Before the solutions are described, the application scenarios may be described illustratively. Solutions of the present disclosure may be applied to a scenario where a body animation exists in a display interface. This scenario may be, for example, animation retargeting or artificial intelligence body recognition. The body animation may be triggered by a button displayed in the display interface or may be triggered by a preset continuous motion process of a target part of a target object. For example, in a game, a user clicks a button or touches the screen to control a target character release skill in the display interface to make a target part of a target character move to display a special skill effect. At this time, a body animation may be displayed in the display interface by using solutions of the present disclosure to achieve the effect of skeleton retargeting. That is, rendering and display can be performed using solutions of embodiments of the present disclosure to improve the display effect as long as animation data of a body animation is migrated in the display interface, for example, hand animation data or foot animation data is migrated in a scenario such as image display, video display, or live display. If a skeleton model has a target part, for example, a hand or a foot, where skeleton points are dependent on each other, animation data may be migrated using solutions of embodiments of the present disclosure. The apparatus for performing the image processing methods of embodiments of the present disclosure may be integrated in application software having the image processing function. This software may be installed in an electronic device such as a mobile terminal or a PC terminal. This application software may be image or video processing software. Examples of this software are not enumerated here as long as this software can implement image or video processing.

FIG. 1 is a flowchart of an image processing method according to an embodiment of the present disclosure. This embodiment of the present disclosure is applicable to the scenario where a target part in a to-be-processed video frame is processed and displayed. The method may be performed by an image processing apparatus. The apparatus may be implemented in software and/or hardware, for example, an electronic device. The electronic device may be, for example, a mobile terminal, a PC terminal, or a server.

As shown in FIG. 1, the method includes the steps below:

In S110, a to-be-registered skeleton chain and a preset skeleton chain of a target part in a to-be-processed video frame are determined.

The to-be-processed video frame may be in a video including the target part. The target part may be a part including a wrist (or ankle) and a finger (or toe). For example, the target part may be a hand or a foot. The to-be-registered skeleton chain may be an initial to-be-registered skeleton model of the target part. See FIG. 2. The to-be-registered skeleton chain includes a to-be-registered wrist or ankle skeleton point and a to-be-registered finger or toe skeleton point. The to-be-registered wrist or ankle skeleton point may correspond to a wrist or ankle in the to-be-registered skeleton chain. For example, the to-be-registered wrist or ankle skeleton point may be Root' of FIG. 2. The to-be-registered finger or toe skeleton point may be a skeleton point corresponding to a finger or toe in the to-be-registered skeleton chain, for example, a skeleton point other than Root' in FIG. 2. The preset skeleton chain may be a skeleton model to which another skeleton model of the target part is to be registered, as shown in FIG. 3. The preset skeleton chain includes a preset wrist or ankle skeleton point and a preset finger or toe skeleton point. The preset wrist or ankle skeleton point may be a skeleton point corresponding to a wrist or ankle in the preset skeleton chain. For example, the preset wrist or ankle skeleton point may be Root in FIG. 3. The preset finger or toe skeleton point may be a skeleton point corresponding to a finger or toe in the preset skeleton chain. For example, the preset finger or toe skeleton point may be a skeleton point other than Root in FIG. 3.

For example, the to-be-processed video frame may be acquired, and the target part in the to-be-processed video frame may be determined. Accordingly, the to-be-registered skeleton chain can be extracted according to the target part in the to-be-processed video frame, and the preset skeleton chain corresponding to the target part can be determined according to the action corresponding to the target part.

It is to be noted that preset skeleton chains may correspond to the actions of different target parts. In this embodiment of the present disclosure, the to-be-registered skeleton chain can be registered to the pose corresponding to the preset skeleton chain, that is, rendering and display are performed according to the preset skeleton chain so that the action of the target part can be completed.

In S120, wrist or ankle state information of the to-be-registered wrist or ankle skeleton point is determined according to first pose information of the to-be-registered wrist or ankle skeleton point and second pose information of the preset wrist or ankle skeleton point.

The first pose information may be position information and posture information of the to-be-registered wrist or ankle skeleton point. The second pose information may be position information and posture information of the preset wrist or ankle skeleton point. The wrist or ankle state information may be used for indicating the registration result of the wrist or ankle skeleton point. The wrist or ankle state information includes wrist or ankle rotation information and wrist or ankle pose information. The wrist or ankle rotation information may be used for indicating a coordinate rotation transformation. The wrist or ankle rotation information may be represented by a wrist or ankle rotation matrix. The wrist or ankle pose information may include position information and posture information.

For example, in the global coordinate system, the first pose information of the to-be-registered wrist or ankle skeleton point is different from the second pose information of the preset wrist or ankle skeleton point: therefore, the two are required to be aligned. Based on the alignment between the first pose information of the to-be-registered wrist or ankle skeleton point and the second pose information of the preset wrist or ankle skeleton point, the wrist or ankle state information required for registration of the to-be-registered wrist or ankle skeleton point, that is, the information required for transformation of the pose of the to-be-registered wrist or ankle, is determined.

For example, a to-be-registered local coordinate system may be established according to the to-be-registered wrist or ankle skeleton point, a preset local coordinate system may be established according to the preset wrist or ankle skeleton point, wrist or ankle rotation information corresponding to coordinate system transformation may be determined, and wrist or ankle pose information required for transformation from the to-be-registered wrist or ankle skeleton point to the preset wrist or ankle skeleton point may be determined. The wrist or ankle rotation information and the wrist or ankle pose information are used as the wrist or ankle state information.

In S130, finger or toe state information of the to-be-registered finger or toe skeleton point is determined according to the wrist or ankle state information, third pose information of the to-be-registered finger or toe skeleton point, and fourth pose information of the preset finger or toe skeleton point.

The third pose information may be position information and posture information of the to-be-registered finger or toe skeleton point. The fourth pose information may be position information and posture information of the preset finger or toe skeleton point. The finger or toe state information may be used for indicating the registration result of the finger or toe skeleton point. The finger or toe state information includes finger or toe rotation information and finger or toe pose information. The finger or toe rotation information may be represented by a finger or toe rotation matrix. The finger or toe pose information may include position information and posture information.

For example, a finger or toe skeleton point is dependent on a wrist or ankle skeleton point and/or a finger or toe skeleton point, and vice versa: and each finger or toe skeleton point is directly or indirectly dependent on the wrist or ankle skeleton point, and vice versa: therefore, alignment may be performed according to the wrist or ankle state information, the third pose information of the to-be-registered finger or toe skeleton point, and the fourth pose information of the preset finger or toe skeleton point so that the finger or toe state information of the to-be-registered finger or toe skeleton point, that is, the information required for transformation of the pose of the to-be-registered finger or toe, is determined.

In S140, the target part is displayed in the to-be-processed video frame according to the wrist or ankle state information and the finger or toe state information.

For example, it is feasible to process the to-be-registered skeleton chain according to the wrist or ankle state information and the finger or toe state information to process the to-be-registered skeleton chain as the target part and render the to-be-registered skeleton chain in the to-be-processed video frame to accurately display the target part in the to-be-processed video frame according to the pose information of the preset skeleton chain.

Based on the preceding example, in order that the verisimilitude and accuracy of the display effect of the target part can be improved, the display positions and display postures of multiple skeleton points of the target part in the display interface may be adjusted according to the wrist or ankle state information and the finger or toe state information so that the target video frame corresponding to the to-be-processed video frame is obtained.

The display position may be information for describing a position. For example, the display position may be position coordinate information of a skeleton point in the display interface. The display pose may be information for describing a posture. For example, the display pose may be information about the included angle between a skeleton point and a coordinate axis in the display interface. The target video frame may be a video frame obtained after the target part in the to-be-processed video frame is processed.

For example, after the wrist or ankle state information and the finger or toe state information are acquired, the wrist or ankle skeleton point of the target part in the to-be-processed video frame may be adjusted according to the wrist or ankle state information, and the finger or toe skeleton point of the target part in the to-be-processed video frame may be adjusted according to the finger or toe state information so that the display positions and display postures of the multiple skeleton points of the target part are determined: and the skeleton points of the target part may be rendered to the display interface according to the display positions and the display postures, and this video frame is used as the target video frame.

It is to be noted that in the process of adjusting the display positions and display postures of the multiple skeleton points of the target part in the display interface, a skin effect may be added to the skeleton chain of the target part so that the target part is displayed as closer to the skin, and thus the display effect is improved.

Based the preceding example, in order that the display effect of the target part can be improved, the visual effect can be improved, and display distortion can be prevented, the display may be performed in the manner below:

In response to determining that the position offset between the to-be-registered wrist or ankle skeleton point and the preset wrist or ankle skeleton point is greater than a preset offset threshold according to the wrist or ankle state information, length information of at least one of an arm skeleton chain or a leg skeleton chain to which the to-be-registered wrist or ankle skeleton point belongs is determined: and the display position of at least one skeleton point of the at least one of the arm skeleton chain or the leg skeleton chain is adjusted according to the length information and the position offset.

The position offset may be the distance between the position information of the to-be-registered wrist or ankle skeleton point and the position information of the preset wrist or ankle skeleton point. The preset offset threshold may be the maximum distance by which the to-be-registered wrist or ankle skeleton point can deviate. The arm skeleton chain may correspond to an arm that serves as the target part. The leg skeleton chain may correspond to a leg that serves as the target part. The length information may be the length value of the arm skeleton chain and/or the leg skeleton chain.

For example, if it is determined according to the wrist or ankle state information that the position offset between the to-be-registered wrist or ankle skeleton point and the preset wrist or ankle skeleton point is greater than the preset offset threshold, an adjustment of the to-be-registered wrist or ankle skeleton point cannot make the to-be-registered wrist or ankle skeleton point registered to the preset wrist or ankle skeleton point. In this case, an adjustment of at least one skeleton point of the at least one of the arm skeleton chain or the leg skeleton chain to which the to-be-registered wrist or ankle skeleton point belongs can make the to-be-registered wrist or ankle skeleton point registered to the preset wrist or ankle skeleton point. Length information of the at least one of the arm skeleton chain or the leg skeleton chain to which the to-be-registered wrist or ankle skeleton point belongs may be determined: and the display position of at least one skeleton point of the at least one of the arm skeleton chain or the leg skeleton chain may be adjusted according to the length information and the position offset. For example, the display positions of the multiple skeleton points may be determined by being elongated to scale so that the to-be-registered wrist or ankle skeleton point can be registered according to the wrist or ankle state information.

FIG. 4 is a diagram illustrating an adjustment of an arm skeleton chain. In FIG. 4, W indicates a to-be-registered wrist or ankle skeleton point, and T indicates a preset wrist or ankle skeleton point. As can be seen from the upper drawing of FIG. 4, the position offset between the to-be-registered wrist or ankle skeleton point and the preset wrist or ankle skeleton point is greater than the preset offset threshold, that is, the to-be-registered wrist or ankle skeleton point cannot reach the preset wrist or ankle skeleton point. Therefore, the arm skeleton chain U-L-W may elongated to scale according to the length information of the upper arm U-L and the length information of the lower arm L-W so that the display position of L and the display position of W are corrected. The to-be-registered wrist or ankle skeleton point W can thus be registered to the preset wrist or ankle skeleton point T. See FIG. 4.

In the solution of this embodiment of the present disclosure, when it is determined that skeleton retargeting is required, a to-be-registered wrist or ankle skeleton point in a to-be-registered skeleton chain in an animation and a preset wrist or ankle skeleton point in a preset skeleton chain may be registered so that wrist or ankle state information of the to-be-registered wrist or ankle skeleton point is obtained: then finger or toe state information of multiple to-be-registered finger or toe skeleton points may be determined according to multiple preset finger or toe skeleton points in the preset skeleton chain and pose information of the to-be-registered finger or toe skeleton points: and then display information of a target part in a to-be-processed video frame is adjusted according to the wrist or ankle state information and the finger or toe state information. In this manner, after animation data of the target part is migrated, the proneness to "clipping through", poor display effect of the target part, and poor verisimilitude of the target part are prevented, and the verisimilitude of the target part displayed in a display interface is improved without "clipping through" so that the user experience is improved.

FIG. 5 is a flowchart of another image processing method according to an embodiment of the present disclosure. Based on the preceding embodiment, the wrist or ankle state information of the to-be-registered wrist or ankle skeleton point may be determined first. For the implementation manner, see the description of the solution. In this embodiment, terms same as or corresponding to those in the preceding embodiments are not explained again here.

As shown in FIG. 5, the method includes the steps below:

In S210, a to-be-registered skeleton chain and a preset skeleton chain of a target part in a to-be-processed video frame are determined.

In S220, first rotation information is determined according to the first pose information of the to-be-registered wrist or ankle skeleton point and third pose information of at least one to-be-registered finger or toe skeleton point directly associated with the to-be-registered wrist or ankle skeleton point.

The third pose information may be position information and posture information of the at least one to-be-registered finger or toe skeleton point directly associated with the to-be-registered wrist or ankle skeleton point. The first rotation information may correspond to the to-be-registered wrist or ankle skeleton point or may be in the form of a rotation matrix or a quaternion.

For example, that at least one to-be-registered finger or toe skeleton point directly associated with the to-be-registered wrist or ankle skeleton point may be determined may be understood as that first to-be-registered finger or toe skeleton point in each extension direction from the to-be-registered wrist or ankle skeleton point to multiple finger or toe tips is determined as a directly associated to-be-registered finger or toe skeleton point. For example, Root' of FIG. 2 indicates a to-be-registered wrist or ankle skeleton point, and U', P', K', F', and A' of FIG. 2 are each a to-be-registered finger or toe skeleton point directly associated with the to-be-registered wrist or ankle skeleton point of FIG. 2. The rotation matrix corresponding to the to-be-registered wrist or ankle skeleton point can be determined according to the first pose information of the to-be-registered wrist or ankle skeleton point and the third pose information of the at least one to-be-registered finger or toe skeleton point directly associated with the to-be-registered wrist or ankle skeleton point, and the first rotation information may be determined according to the rotation matrix.

Based on the preceding example, if the at least one to-be-registered finger or toe skeleton point includes a first to-be-registered finger or toe skeleton point and a second to-be-registered finger or toe skeleton point, the first rotation information may be determined more quickly and accurately in the manner below:

A first vector is determined according to the first pose information and the pose information of the first to-be-registered finger or toe skeleton point. A second vector is determined according to the first pose information and the pose information of the second to-be-registered finger or toe skeleton point. The first rotation information is determined according to the first vector and the second vector.

The first vector may point from the to-be-registered wrist or ankle skeleton point to the first to-be-registered finger or toe skeleton point. The second vector may point from the to-be-registered wrist or ankle skeleton point to the second to-be-registered finger or toe skeleton point. It is to be noted that the first to-be-registered finger or toe skeleton point and the second to-be-registered finger or toe skeleton point are any two of the to-be-registered finger or toe skeleton points directly associated with the to-be-registered wrist or ankle skeleton point. This is not limited in this embodiment.

For example, the vector pointing from the to-be-registered wrist or ankle skeleton point to the first to-be-registered finger or toe skeleton point can be determined as the first vector according to position information in the first pose information and position information in the pose information of the first to-be-registered finger or toe skeleton point. The vector pointing from the to-be-registered wrist or ankle skeleton point to the second to-be-registered finger or toe skeleton point can be determined as the second vector according to position information in the first pose information and position information in the pose information of the second to-be-registered finger or toe skeleton point. A first vertical vector perpendicular to both the first vector and the second vector is obtained from the cross product of the two vectors. A second vertical vector is obtained from the cross product of the first vertical vector and any one of the first vector or the second vector. Then a rotation matrix is constructed based on the first vertical vector, the second vertical vector, and the vector (the first vector or the second vector) corresponding to the second vertical vector. The rotation matrix may be used as the first rotation information: or the rotation matrix may be transformed into a quaternion, where the quaternion is used as the first rotation information.

FIG. 6 is a diagram of a to-be-registered wrist or ankle skeleton point and at least one to-be-registered finger or toe skeleton point directly associated with the to-be-registered wrist or ankle skeleton point. In FIG. 6, O' indicates a to-be-registered wrist or ankle skeleton point, and A', B', C', D', and E' are to-be-registered finger or toe skeleton points directly associated with the to-be-registered wrist or ankle skeleton point. C' indicates a first to-be-registered finger or toe skeleton point. B' indicates a second to-be-registered finger or toe skeleton point. A first vector O'C' and a second vector O'B' can be determined from C' and B'. The first vertical vector up'=O'C'×O'B'. The second vertical vector is determined by the first vector O'C'. forward'=O'C'. The second vertical vector left'=up'×forward'. Then the rotation matrix can be determined according to left', up', and forward', and the rotation matrix is transformed to obtain a quaternion q', that is, the first rotation information.

In S230, second rotation information is determined according to the second pose information of the preset wrist or ankle skeleton point and fourth pose information of at least one preset finger or toe skeleton point directly associated with the preset wrist or ankle skeleton point.

The fourth pose information may be position information and posture information of the at least one preset finger or toe skeleton point directly associated with the preset wrist or ankle skeleton point. The second rotation information may correspond to the preset wrist or ankle skeleton point or may be in the form of a rotation matrix or a quaternion.

For example, that at least one preset finger or toe skeleton point directly associated with the preset wrist or ankle skeleton point may be determined may be understood as that the first to-be-registered finger or toe skeleton point in each extension direction extending from the preset wrist or ankle skeleton point to multiple finger or toe tips is determined as a directly associated preset finger or toe skeleton point. For example, Root of FIG. 3 indicates a preset wrist or ankle skeleton point, and V. Q. L. G, and A of FIG. 3 are each a to-be-registered finger or toe skeleton point directly associated with the preset wrist or ankle skeleton point of FIG. 3. The rotation matrix corresponding to the preset wrist or ankle skeleton point can be determined according to the second pose information of the preset wrist or ankle skeleton point and the fourth pose information of the at least one preset finger or toe skeleton point directly associated with the preset wrist or ankle skeleton point, and the second rotation information may be determined according to the rotation matrix.

Based on the preceding example, if the at least one preset finger or toe skeleton point includes a first preset finger or toe skeleton point and a second preset finger or toe skeleton point, the second rotation information may be determined more quickly and accurately in the manner below:

A third vector is determined according to the second pose information and the pose information of the first preset finger or toe skeleton point. A fourth vector is determined according to the second pose information and the pose information of the second preset finger or toe skeleton point.

The second rotation information is determined according to the third vector and the fourth vector.

The third vector may point from the preset wrist or ankle skeleton point to the first preset finger or toe skeleton point. The fourth vector may point from the preset wrist or ankle skeleton point to the second preset finger or toe skeleton point. It is to be noted that the first preset finger or toe skeleton point and the second preset finger or toe skeleton point are any two of the preset finger or toe skeleton points directly associated with the preset wrist or ankle skeleton point. This is not limited in this embodiment.

For example, the vector pointing from the preset wrist or ankle skeleton point to the first preset finger or toe skeleton point can be determined as the third vector according to position information in the second pose information and position information in the pose information of the first preset finger or toe skeleton point. For example, the vector pointing from the preset wrist or ankle skeleton point to the second preset finger or toe skeleton point can be determined as the fourth vector according to position information in the second pose information and position information in the pose information of the second preset finger or toe skeleton point. A third vertical vector perpendicular to both the third vector and the fourth vector is obtained from the cross product of the two vectors. A fourth vertical vector is obtained from the cross product of the third vertical vector and any one of the third vector or the fourth vector. Then a rotation matrix is constructed based on the third vertical vector, the fourth vertical vector, and the vector (the third vector or the fourth vector) corresponding to the fourth vertical vector. The rotation matrix may be used as the second rotation information: or the rotation matrix may be transformed into a quaternion, where the quaternion is used as the second rotation information.

Figure 7:
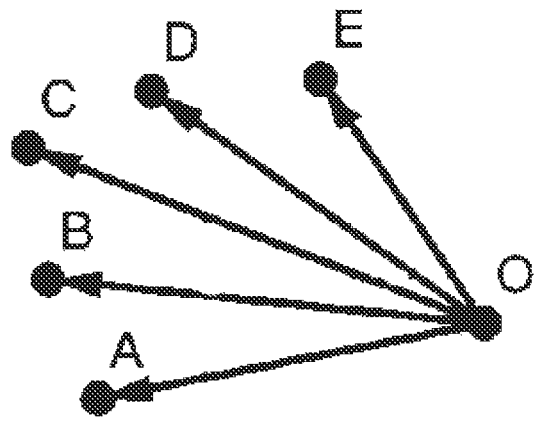
FIG. 7 is a diagram of a preset wrist or ankle skeleton point and at least one preset finger or toe skeleton point directly associated with the preset wrist or ankle skeleton point according to an embodiment of the present disclosure.

FIG. 7 is a diagram of a preset wrist or ankle skeleton point and at least one preset finger or toe skeleton point directly associated with the preset wrist or ankle skeleton point. In FIG. 7, O indicates a preset wrist or ankle skeleton point, and A, B, C, D, and E are preset finger or toe skeleton points directly associated with the preset wrist or ankle skeleton point. C indicates a first preset finger or toe skeleton point. B indicates a second preset finger or toe skeleton point. A third vector OC and a fourth vector OB can be determined from C and B. The third vertical vector up=OC× OB. The fourth vertical vector is determined by the third vector OC. forward=OC. The fourth vertical vector left=up× forward. Then the rotation matrix can be determined according to left, up, and forward, and the rotation matrix is transformed to obtain a quaternion q, that is, the second rotation information.

In 240, the wrist or ankle state information of the to-be-registered wrist or ankle skeleton point is determined according to the first rotation information and the second rotation information.

For example, the to-be-registered wrist or ankle skeleton point may be registered based on the preset wrist or ankle skeleton point according to the first rotation information and the second rotation information, and the information of the registered wrist or ankle skeleton point is used as the wrist or ankle state information of the to-be-registered wrist or ankle skeleton point.

Based on the preceding example, to determine the wrist or ankle state information more accurately and quickly, an alignment transformation matrix may be used.

An alignment transformation matrix is determined according to the second rotation information and the inverse of the first rotation information.

The wrist or ankle state information is determined according to the alignment transformation matrix and the first pose information of the to-be-registered wrist or ankle skeleton point.

The alignment transformation matrix may be used for aligning the to-be-registered wrist or ankle skeleton point with the preset wrist or ankle skeleton point.

For example, the alignment transformation matrix is obtained from the product of the second rotation information and the inverse of the first rotation information. The first pose information is processed according to the alignment transformation matrix so that position information and posture information in the wrist or ankle pose information is obtained.

Illustratively, if the first rotation information is q' and the second rotation information is q, the alignment transformation matrix r=q*Inverse (q'), where Inverse (·) denotes an inverse operation.

Based on the preceding example, to align the position of the to-be-registered wrist or ankle skeleton point with the position of the preset wrist or ankle skeleton point more accurately, wrist or ankle pose information in the wrist or ankle state information may be determined according to the alignment transformation matrix and the first pose information of the to-be-registered wrist or ankle skeleton point in the manner below.

Position information in the wrist or ankle pose information is determined according to position information in the second pose information. Posture information in the wrist or ankle pose information is determined according to the alignment transformation matrix and position information in the first pose information.

For example, position information in the second pose information is determined as position information in the wrist or ankle pose information. Posture information in the wrist or ankle pose information is obtained from the product of position information in the first pose information and the alignment transformation matrix.

Illustratively, if position information in the second pose information is Op, and position information in the wrist or ankle pose information is O'p, then O'p=Op. If position information in the first pose information is Or, the alignment transformation matrix is r, and wrist or ankle pose information in the wrist or ankle state information is O'r, then O'r=Or*r.

Through S220 to S240, the first rotation information and the second rotation information can be determined accurately and quickly so that the to-be-registered wrist or ankle skeleton point and the preset wrist or ankle skeleton point can be unified and so that the registration efficiency of the wrist or ankle skeleton point can be improved.

In S250, finger or toe state information of the to-be-registered finger or toe skeleton point is determined according to the wrist or ankle state information, third pose information of the to-be-registered finger or toe skeleton point, and fourth pose information of the preset finger or toe skeleton point.

In S260, the target part is displayed in the to-be-processed video frame according to the wrist or ankle state information and the finger or toe state information.

In the solution of this embodiment of the present disclosure, a to-be-registered skeleton chain and a preset skeleton chain of a target part in a to-be-processed video frame are determined: first rotation information is determined according to the first pose information of the to-be-registered wrist or ankle skeleton point and third pose information of at least one to-be-registered finger or toe skeleton point directly associated with the to-be-registered wrist or ankle skeleton point: second rotation information is determined according to the second pose information of the preset wrist or ankle skeleton point and fourth pose information of at least one preset finger or toe skeleton point directly associated with the preset wrist or ankle skeleton point: the wrist or ankle state information of the to-be-registered wrist or ankle skeleton point is determined according to the first rotation information and the second rotation information so that the to-be-registered wrist or ankle skeleton point can be registered to the preset wrist or ankle skeleton point: finger or toe state information of the to-be-registered finger or toe skeleton point is determined according to the wrist or ankle state information, third pose information of the to-be-registered finger or toe skeleton point, and fourth pose information of the preset finger or toe skeleton point: and the target part is displayed in the to-be-processed video frame according to the wrist or ankle state information and the finger or toe state information. In this manner, poor display effect of the target part and poor verisimilitude of the target part caused by "clipping through" when animation data of the wrist or ankle in the target part is migrated are prevented, and the display effect and verisimilitude of the wrist or ankle in the target part displayed in a display interface is improved without "clipping through" so that the user experience is improved.

FIG. 8 is a flowchart of another image processing method according to an embodiment of the present disclosure. After the to-be-registered wrist or ankle skeleton point is determined, the finger or toe state information of multiple to-be-registered finger or toe skeleton points may be determined sequentially. For the implementation manner, see the description of the solution. In this embodiment, terms same as or corresponding to those in the preceding embodiments are not explained again here.

As shown in FIG. 8, the method includes the steps below:

In S301, a to-be-registered skeleton chain and a preset skeleton chain of a target part in a to-be-processed video frame are determined.

In S302, wrist or ankle state information of the to-be-registered wrist or ankle skeleton point is determined according to first pose information of the to-be-registered wrist or ankle skeleton point and second pose information of the preset wrist or ankle skeleton point.

In S303, preset first dependency information of the to-be-registered wrist or ankle skeleton point and at least one to-be-registered finger or toe skeleton point and preset second dependency information of the preset wrist or ankle skeleton point and at least one preset finger or toe skeleton point are retrieved.

The dependency information may be used for describing information about a finger or toe skeleton point or a wrist or ankle skeleton point on which each finger or toe skeleton point is directly dependent. The first dependency information and the second dependency information each include a finger or toe skeleton point or a wrist or ankle skeleton point on which at least one finger or toe skeleton point in the same branch is directly dependent in a skeleton chain. The first dependency information corresponds to the to-be-registered skeleton chain. The second dependency information corresponds to the preset skeleton chain.

For example, the first dependency information of the to-be-registered wrist or ankle skeleton point and the to-be-registered finger or toe skeleton point may be set according to the connection information of the to-be-registered wrist or ankle skeleton point and multiple to-be-registered finger or toe skeleton points in the to-be-registered skeleton chain. The second dependency information of the preset wrist or ankle skeleton point and the preset finger or toe skeleton point may be set according to the connection information of the preset wrist or ankle skeleton point and multiple preset finger or toe skeleton points in the preset skeleton chain. For the sake of subsequent skeleton point registration, the first dependency information and the second dependency information may be retrieved.

It is to be noted that the dependency information corresponding to the finger or toe skeleton point is an adjacent finger or toe skeleton point or an adjacent wrist or ankle skeleton point in the direction of extension from the finger or toe skeleton point to the wrist or ankle.

Illustratively, in the branch Root'-U'-V'-W'-X'-Y' of the to-be-registered skeleton chain of FIG. 2, the to-be-registered finger or toe skeleton point U' is directly dependent on the to-be-registered wrist or ankle skeleton point Root', that is, the first dependency information of U' is Root': the to-be-registered finger or toe skeleton point V' is directly dependent on the to-be-registered finger or toe skeleton point U', that is, the first dependency information of V' is U': and the first dependency information of other to-be-registered finger or toe skeleton points can be obtained in the same manner. Thus, the first dependency information of the to-be-registered wrist or ankle skeleton point and the to-be-registered finger or toe skeleton points of FIG. 2 is obtained. Illustratively, in the branch Root-U-V-W-X-Y of the preset skeleton chain of FIG. 3, the preset finger or toe skeleton point V is directly dependent on the preset wrist or ankle skeleton point Root, that is, the second dependency information of V is Root: the preset finger or toe skeleton point W is directly dependent on the preset finger or toe skeleton point V, that is, the second dependency information of W is V: and the second dependency information of other preset finger or toe skeleton points can be obtained in the same manner. Thus, the second dependency information of the preset wrist or ankle skeleton point and the preset finger or toe skeleton points of FIG. 3 is obtained.

In S304, the processing priority order of the at least one to-be-registered finger or toe skeleton point and the processing priority order of the at least one preset finger or toe skeleton point are determined according to the first dependency information and the second dependency information to determine finger or toe state information of the at least one to-be-registered finger or toe skeleton point according to the processing priority order of the at least one to-be-registered finger or toe skeleton point and the processing priority order of the at least one preset finger or toe skeleton point.

The processing priority order may be determined according to the dependency information. For example, the processing priority level of a skeleton point is lower than the priority level of the dependency information of the skeleton point.

For example, the processing priority order of multiple to-be-registered finger or toe skeleton points may be determined according to the first dependency information, and the processing priority order of multiple preset finger or toe skeleton points may be determined according to the second dependency information.

Illustratively, in the branch Root'-U'-V'-W'-X'-Y' of FIG. 2, the processing priority order of the to-be-registered finger or toe skeleton points is U'-V'-W'-X'-Y' from high to low: Illustratively, in the branch Root-U-V-W-X-Y of FIG. 3, the processing priority order of the preset finger or toe skeleton points is U-V-W-X-Y from high to low.

Through S303 and S304, the processing priority order of multiple to-be-registered finger or toe skeleton points and the processing priority order of multiple preset finger or toe skeleton points can be determined so that the to-be-registered finger or toe skeleton points can later be registered according to the processing priority order.

In S305, at least one finger or toe skeleton point group is determined.

A finger or toe skeleton point group may be a combination of a finger or toe skeleton point in the to-be-registered skeleton chain and a finger or toe skeleton point in the preset skeleton chain, where the finger or toe skeleton point in the to-be-registered skeleton chain and the finger or toe skeleton point in the preset skeleton chain correspond to each other. Each of the at least one finger or toe skeleton point group includes a preset finger or toe skeleton point and a to-be-registered finger or toe skeleton point that belong to skeleton chain branches corresponding to each other and that have the same processing priority level.

Illustratively, as shown in FIGS. 2 and 3, the branch Root'-A'-B'-C'-D'-E' in the to-be-registered skeleton chain corresponds to the branch Root-A-B-C-D-E in the preset skeleton chain. The preset finger or toe skeleton point A and the to-be-registered finger or toe skeleton point A' have the same processing priority level and thus can be classified into one finger or toe skeleton point group. Similarly, other finger or toe skeleton point groups can be determined.

In S306, for each of the at least one finger or toe skeleton point group, a front dependency skeleton point group and a rear dependency skeleton point group of the current finger or toe skeleton point group is determined according to the processing priority level.

The front dependency skeleton point group may be a wrist or ankle skeleton point group or a finger or toe skeleton point group on which the current finger or toe skeleton point group is dependent. The rear dependency skeleton point group may be a finger or toe skeleton point group dependent on the current finger or toe skeleton point group. The front dependency skeleton point group includes a wrist or ankle skeleton point group or a finger or toe skeleton point group. The rear dependency skeleton point group includes a finger or toe skeleton point group. It is to be understood that the rear dependency skeleton point group is directly dependent on the current finger or toe skeleton point group, and the current finger or toe skeleton point group is directly dependent on the front dependency skeleton point group.

Similarly, each finger or toe skeleton point group can be used as the current finger or toe skeleton point group so that the front dependency skeleton point group and the rear dependency skeleton point group of each finger or toe skeleton point group can be determined. According to processing priority order, it is determined that the finger or toe skeleton point group directly dependent on the current finger or toe skeleton point group is the rear dependency skeleton point group, and the finger or toe skeleton point group or the wrist or ankle skeleton point group on which the current finger or toe skeleton point group is directly dependent is the front dependency skeleton point group.

Illustratively, as shown in FIGS. 2 and 3, the finger or toe skeleton point group formed of the preset finger or toe skeleton point A and the to-be-registered finger or toe skeleton point A' is used as the current finger or toe skeleton point group. In this case, according to processing priority order, it is determined that the front dependency skeleton point group on which the current finger or toe skeleton point group is dependent is the wrist or ankle skeleton point group formed of the preset wrist or ankle skeleton point Root and the to-be-registered wrist or ankle skeleton point Root' and that the rear dependency skeleton point group dependent on the current finger or toe skeleton point group is the finger or toe skeleton point group formed of the preset finger or toe skeleton point B and the to-be-registered finger or toe skeleton point B'. Similarly, the front dependency skeleton point group and the rear dependency skeleton point group of each finger or toe skeleton point group can be determined.

In S307, it is determined whether the current dependency skeleton point group is a wrist or ankle skeleton point group or a finger or toe skeleton point group: in response to the determination result that the current dependency skeleton point group is a wrist or ankle skeleton point group, S308 is performed: and in response to the determination result that the current dependency skeleton point group is a finger or toe skeleton point group, S309 is performed.

In S308, finger or toe state information of a to-be-registered finger or toe skeleton point in the current finger or toe skeleton point group is determined according to the wrist or ankle rotation information in the wrist or ankle state information, pose information in the current finger or toe skeleton point group, and pose information in the rear dependency skeleton point group: and S310 is performed.

For example, the rotation matrix of a to-be-registered skeleton point in the current finger or toe skeleton point group can be determined according to pose information in the current finger or toe skeleton point group and pose information in the rear dependency skeleton point group. The current finger or toe rotation information of the to-be-registered skeleton point in the current finger or toe skeleton point group can be determined according to the rotation matrix and the wrist or ankle rotation information. The current finger or toe pose information of the to-be-registered skeleton point in the current finger or toe skeleton point group can be determined according to the current finger or toe rotation information and the wrist or ankle rotation information. Then the current finger or toe rotation information and the current finger or toe pose information are determined as the finger or toe state information of the to-be-registered finger or toe skeleton point in the current finger or toe skeleton point group.

In S309, the finger or toe state information of the to-be-registered finger or toe skeleton point in the current finger or toe skeleton point group is determined according to the target finger or toe rotation information in the finger or toe state information of the to-be-registered skeleton point in the front dependency skeleton point group, the pose information in the current finger or toe skeleton point group, and the pose information in the rear dependency skeleton point group; and S310 is performed.

For example, the rotation matrix of a to-be-registered skeleton point in the current finger or toe skeleton point group can be determined according to pose information in the current finger or toe skeleton point group and pose information in the rear dependency skeleton point group. The current finger or toe rotation information of the to-be-registered skeleton point in the current finger or toe skeleton point group can be determined according to the rotation matrix and the target finger or toe rotation information. The current finger or toe pose information of the to-be-registered skeleton point in the current finger or toe skeleton point group can be determined according to the current finger or toe rotation information and the target finger or toe rotation information. Then the current finger or toe rotation information and the current finger or toe pose information are determined as the finger or toe state information of the to-be-registered finger or toe skeleton point in the current finger or toe skeleton point group.

Through S305 to S308 or S305 to S309, the finger or toe state information of multiple to-be-registered finger or toe skeleton points in each branch of the to-be-registered skeleton chain can be determined sequentially so that the finger or toe rotation information of the multiple to-be-registered finger or toe skeleton points and the finger or toe pose information of the multiple to-be-registered finger or toe skeleton points can be registered to multiple preset finger or toe skeleton points accurately so that the registration accuracy and the registration efficiency can be improved.

Based on the preceding example, the current finger or toe rotation information and the current finger or toe pose information of a to-be-registered finger or toe skeleton point in the current finger or toe skeleton point group can be determined in the manner below so that the finger or toe state information of the to-be-registered finger or toe skeleton point in the current finger or toe skeleton point group can be determined. In this manner, the complexity of determining the finger or toe state information is reduced, and the accuracy of determining the finger or toe state information is improved.

The current finger or toe rotation information of the to-be-registered skeleton point in the current finger or toe skeleton point group is determined according to the target finger or toe rotation information, third pose information and fourth pose information in the current finger or toe skeleton point group, and third pose information and fourth pose information in the rear dependency skeleton point group.

For example, the direction of the current to-be-registered finger or toe skeleton can be determined according to the third pose information in the current finger or toe skeleton point group and the third pose information in the rear dependency skeleton point group: the direction of the current preset finger or toe skeleton can be determined according to the fourth pose information in the current finger or toe skeleton point group and the fourth pose information in the rear dependency skeleton point group: the rotation matrix required to rotate the direction of the current to-be-registered finger or toe skeleton to the direction of the current preset finger or toe skeleton can be determined according to the direction of the current to-be-registered finger or toe skeleton and the direction of the current preset finger or toe skeleton: and the current finger or toe rotation information of the to-be-registered skeleton point in the current finger or toe skeleton point group can be determined according to the target finger or toe rotation information and the determined rotation matrix.

The current finger or toe pose information of the to-be-registered skeleton point in the current finger or toe skeleton point group is determined according to the target finger or toe rotation information and the current finger or toe rotation information.

For example, position information in the current finger or toe pose information of the to-be-registered skeleton point in the current finger or toe skeleton point group can be determined according to position information in the fourth pose information in the current finger or toe skeleton point group: and posture information of the to-be-registered skeleton point in the current finger or toe skeleton point group can be determined according to the target finger or toe rotation information and the current finger or toe rotation information. The determined position information and the determined posture information are used as the pose information of the to-be-registered skeleton point in the current finger or toe skeleton point group.

The finger or toe state information of the to-be-registered skeleton point is determined according to the current finger or toe rotation information and the current finger or toe pose information.

For example, the current finger or toe rotation information and the current finger or toe pose information are used as the finger or toe state information of the to-be-registered skeleton point.

Based on the preceding example, the current finger or toe rotation information of the to-be-registered skeleton point in the current finger or toe skeleton point group may be determined in the manner below: The current finger or toe rotation information is made to transition smoothly so that later, the effect of display based on the current finger or toe rotation information is more verisimilar.

A third rotation vector is determined according to the third pose information in the current finger or toe skeleton point group and the third pose information in the rear dependency skeleton point group: a fourth rotation vector is determined according to the fourth pose information in the current finger or toe skeleton point group and the fourth pose information in the rear dependency skeleton point group: a rotation matrix for rotation from the to-be-registered finger or toe skeleton point in the current finger or toe skeleton point group to a corresponding preset finger or toe skeleton point is determined according to the third rotation vector and the fourth rotation vector; and the current finger or toe rotation information of the to-be-registered skeleton point in the current finger or toe skeleton point group is determined according to the rotation matrix and the target finger or toe rotation information.

The third rotation vector may point from a to-be-registered finger or toe skeleton point in the current finger or toe skeleton point group to a to-be-registered finger or toe skeleton point in the rear dependency skeleton point group. The fourth rotation vector may point from a preset finger or toe skeleton point in the current finger or toe skeleton point group to a preset finger or toe skeleton point in the rear dependency skeleton point group.

For example, a vector pointing from a to-be-registered finger or toe skeleton point in the current finger or toe skeleton point group to a to-be-registered finger or toe skeleton point in the rear dependency skeleton point group can be determined as a third rotation vector according to position information in the third pose information in the current finger or toe skeleton point group and position information in the third pose information in the rear dependency skeleton point group; and a vector pointing from a preset finger or toe skeleton point in the current finger or toe skeleton point group to a preset finger or toe skeleton point in the rear dependency skeleton point group can be determined as a fourth rotation vector according to position information in the fourth pose information in the current finger or toe skeleton point group and position information in the fourth pose information in the rear dependency skeleton point group. A rotation quaternion, that is, rotation matrix, for rotation from the direction of the third rotation vector to the direction of the fourth rotation vector can be determined according to the third rotation vector and the fourth rotation vector. The current finger or toe rotation information of the to-be-registered skeleton point in the current finger or toe skeleton point group can be obtained from the product of the inverse of the target finger or toe rotation information and the rotation matrix.

FIG. 9 is a diagram of a to-be-registered finger or toe skeleton point before rotation. In FIG. 9, R-S-T is a preset skeleton chain, R'-S'-T' is a to-be-registered skeleton chain, S' and S indicate the current finger or toe skeleton point group. T' and T indicate the rear dependency skeleton point group, and R' and R indicate the front dependency skeleton point group. Position information in the third pose information in the current finger or toe skeleton point group is Sp'. Position information in the third pose information in the rear dependency skeleton point group is Tp'. A third rotation vector O=T'p−S'p. Position information in the fourth pose information in the current finger or toe skeleton point group is Sp. Position information in the fourth pose information in the rear dependency skeleton point group is Tp. A fourth rotation vector C=Tp−Sp. The rotation matrix for rotation from the to-be-registered finger or toe skeleton point in the current finger or toe skeleton point group to the corresponding preset finger or toe skeleton point is Q. Q=FromToQuaternion(O,C), indicating the rotation quaternion for rotation from O to C. The target finger or toe rotation information is R'r. The current finger or toe rotation information of the to-be-registered skeleton point in the current finger or toe skeleton point group is S'lr. S'lr=Inverse (R'r)*Q. FIG. 10 is a diagram of a to-be-registered finger or toe skeleton point after rotation.

It is to be noted that in response to initial rotation S'r of the to-be-registered skeleton point in the current finger or toe skeleton point group, Q=FromToQuaternion(O,C)*S'r. That is, the rotation matrix is updated according to the product of the rotation matrix and the initial rotation result of the to-be-registered skeleton point in the current finger or toe skeleton point group.

In S310, the target part is displayed in the to-be-processed video frame according to the wrist or ankle state information and the finger or toe state information.

In the solution of this embodiment of the present disclosure, a to-be-registered skeleton chain and a preset skeleton chain of a target part in a to-be-processed video frame are determined: wrist or ankle state information of the to-be-registered wrist or ankle skeleton point is determined according to first pose information of the to-be-registered wrist or ankle skeleton point and second pose information of the preset wrist or ankle skeleton point: preset first dependency information of the to-be-registered wrist or ankle skeleton point and the to-be-registered finger or toe skeleton point and preset second dependency information of the preset wrist or ankle skeleton point and the preset finger or toe skeleton point are retrieved: the processing priority order of to-be-registered finger or toe skeleton points and the processing priority order of preset finger or toe skeleton points are determined according to the first dependency information and the second dependency information to determine finger or toe state information of the to-be-registered finger or toe skeleton points according to the processing priority order: at least one finger or toe skeleton point is determined: for each of the at least one finger or toe skeleton point group, a front dependency skeleton point group and a rear dependency skeleton point group of the current finger or toe skeleton point group is determined according to the processing priority level: it is determined whether the current dependency skeleton point group is a wrist or ankle skeleton point group or a finger or toe skeleton point group: finger or toe state information of a to-be-registered finger or toe skeleton point in the current finger or toe skeleton point group is determined according to different determination results: and the target part is displayed in the to-be-processed video frame according to the wrist or ankle state information and the finger or toe state information. In this manner, after animation data of the target part is migrated, poor display effect of the target part and poor verisimilitude of the target part caused by "clipping through" are prevented, and the display effect and verisimilitude of the wrist or ankle in the target part displayed are improved without "clipping through" so that the user experience is improved.

FIG. 11 is a block diagram of an image processing apparatus according to an embodiment of the present disclosure. As shown in FIG. 11, the apparatus includes a skeleton chain determination module 410, a wrist or ankle determination module 420, a finger or toe determination module 430, and a display module 440).

The skeleton chain determination module 410 is configured to determine a to-be-registered skeleton chain and a preset skeleton chain of a target part in a to-be-processed video frame, where the to-be-registered skeleton chain includes a to-be-registered wrist or ankle skeleton point and a to-be-registered finger or toe skeleton point, and the preset skeleton chain includes a preset wrist or ankle skeleton point and a preset finger or toe skeleton point. The wrist or ankle determination module 420 is configured to determine wrist or ankle state information of the to-be-registered wrist or ankle skeleton point according to first pose information of the to-be-registered wrist or ankle skeleton point and second pose information of the preset wrist or ankle skeleton point, where the wrist or ankle state information includes wrist or ankle rotation information and wrist or ankle pose information. The finger or toe determination module 430 is configured to determine finger or toe state information of the to-be-registered finger or toe skeleton point according to the wrist or ankle state information, third pose information of the to-be-registered finger or toe skeleton point, and fourth pose information of the preset finger or toe skeleton point, where the finger or toe state information includes finger or toe rotation information and finger or toe pose information. The display module 440 is configured to display the target part in the to-be-processed video frame according to the wrist or ankle state information and the finger or toe state information.

For example, the wrist or ankle determination module 420 is also configured to determine first rotation information according to the first pose information of the to-be-registered wrist or ankle skeleton point and third pose information of at least one to-be-registered finger or toe skeleton point directly associated with the to-be-registered wrist or ankle skeleton point: determine second rotation information according to the second pose information of the preset wrist or ankle skeleton point and fourth pose information of at least one preset finger or toe skeleton point directly associated with the preset wrist or ankle skeleton point: and determine the wrist or ankle state information of the to-be-registered wrist or ankle skeleton point according to the first rotation information and the second rotation information.

For example, the wrist or ankle determination module 420 is also configured to determine an alignment transformation matrix according to the second rotation information and the inverse of the first rotation information: and determine the wrist or ankle state information according to the alignment transformation matrix and the first pose information of the to-be-registered wrist or ankle skeleton point.

For example, the wrist or ankle determination module 420 is also configured to determine position information in the wrist or ankle pose information according to position information in the second pose information: and determine posture information in the wrist or ankle pose information according to the alignment transformation matrix and position information in the first pose information.

For example, the apparatus also includes a dependency processing module configured to retrieve preset first dependency information of the to-be-registered wrist or ankle skeleton point and the to-be-registered finger or toe skeleton point and preset second dependency information of the preset wrist or ankle skeleton point and the preset finger or toe skeleton point, where the first dependency information and the second dependency information each include a finger or toe skeleton point or a wrist or ankle skeleton point on which at least one finger or toe skeleton point in the same branch is directly dependent in a skeleton chain: and determine the processing priority order of to-be-registered finger or toe skeleton points and the processing priority order of preset finger or toe skeleton points according to the first dependency information and the second dependency information to determine finger or toe state information of the to-be-registered finger or toe skeleton points according to the processing priority order.

For example, the finger or toe determination module 430 is also configured to determine at least one finger or toe skeleton point group, where each of the at least one finger or toe skeleton point group includes a preset finger or toe skeleton point and a to-be-registered finger or toe skeleton point that belong to skeleton chain branches corresponding to each other and that have the same processing priority level: for each of the at least one finger or toe skeleton point group, determine a front dependency skeleton point group and a rear dependency skeleton point group of the current finger or toe skeleton point group according to the processing priority level, where the front dependency skeleton point group includes a wrist or ankle skeleton point group or a finger or toe skeleton point group: and in response to determining that the front dependency skeleton point group is the wrist or ankle skeleton point group, determine finger or toe state information of a to-be-registered finger or toe skeleton point in the current finger or toe skeleton point group according to the wrist or ankle rotation information in the wrist or ankle state information, pose information in the current finger or toe skeleton point group, and pose information in the rear dependency skeleton point group.

For example, the finger or toe determination module 430 is also configured to, in response to determining that the front dependency skeleton point group is the finger or toe skeleton point group, determine the finger or toe state information of the to-be-registered finger or toe skeleton point in the current finger or toe skeleton point group according to target finger or toe rotation information in finger or toe state information of a to-be-registered skeleton point in the front dependency skeleton point group, the pose information in the current finger or toe skeleton point group, and the pose information in the rear dependency skeleton point group.

For example, the finger or toe determination module 430 is also configured to determine current finger or toe rotation information of a to-be-registered skeleton point in the current finger or toe skeleton point group according to the target finger or toe rotation information, third pose information and fourth pose information in the current finger or toe skeleton point group, and third pose information and fourth pose information in the rear dependency skeleton point group; determine current finger or toe pose information of the to-be-registered skeleton point in the current finger or toe skeleton point group according to the target finger or toe rotation information and the current finger or toe rotation information: and determine finger or toe state information of the to-be-registered skeleton point in the current finger or toe skeleton point group according to the current finger or toe rotation information and the current finger or toe pose information.

For example, the finger or toe determination module 430 is also configured to determine a third rotation vector according to the third pose information in the current finger or toe skeleton point group and the third pose information in the rear dependency skeleton point group: determine a fourth rotation vector according to the fourth pose information in the current finger or toe skeleton point group and the fourth pose information in the rear dependency skeleton point group; determine, according to the third rotation vector and the fourth rotation vector, a rotation matrix for rotation from the to-be-registered finger or toe skeleton point in the current finger or toe skeleton point group to a corresponding preset finger or toe skeleton point: and determine the current finger or toe rotation information of the to-be-registered skeleton point in the current finger or toe skeleton point group according to the rotation matrix and the target finger or toe rotation information.

For example, the display module 440 is also configured to adjust display positions and display postures of multiple skeleton points of the target part in the display interface of the to-be-processed video frame according to the wrist or ankle state information and the finger or toe state information to obtain the target video frame corresponding to the to-be-processed video frame.

For example, the apparatus also includes an adjustment module configured to, in response to determining that the position offset between the to-be-registered wrist or ankle skeleton point and the preset wrist or ankle skeleton point is greater than the preset offset threshold according to the wrist or ankle state information, determine length information of at least one of an arm skeleton chain or a leg skeleton chain to which the to-be-registered wrist or ankle skeleton point belongs; and adjust the display position of at least one skeleton point of the at least one of the arm skeleton chain or the leg skeleton chain according to the length information and the position offset.

In the solution of this embodiment of the present disclosure, when it is determined that skeleton retargeting is required, a to-be-registered wrist or ankle skeleton point in a to-be-registered skeleton chain in an animation may be registered to a preset wrist or ankle skeleton point in a preset skeleton chain so that wrist or ankle state information of the to-be-registered wrist or ankle skeleton point is obtained: then finger or toe state information of multiple to-be-registered finger or toe skeleton points may be determined according to multiple preset finger or toe skeleton points in the preset skeleton chain and pose information of the to-be-registered finger or toe skeleton points: and then display information of a target part in a to-be-processed video frame is adjusted according to the wrist or ankle state information and the finger or toe state information. In this manner, after animation data of the target part is migrated, the proneness to "clipping through", poor display effect of the target part, and poor verisimilitude of the target part are prevented, and the verisimilitude of the target part displayed in a display interface is improved without "clipping through" so that the user experience is improved.

The image processing apparatuses of embodiments of the present disclosure can perform the image processing methods of embodiments of the present disclosure and have function modules and beneficial effects corresponding to the performed methods.

Units and modules included in the preceding apparatus are divided according to function logic. These units and modules may also be divided in other manners as long as the corresponding functions can be implemented. Moreover, names of these function units are used for distinguishing between these function units and not intended to limit the scope of this embodiment of the present disclosure.

Figure 12:
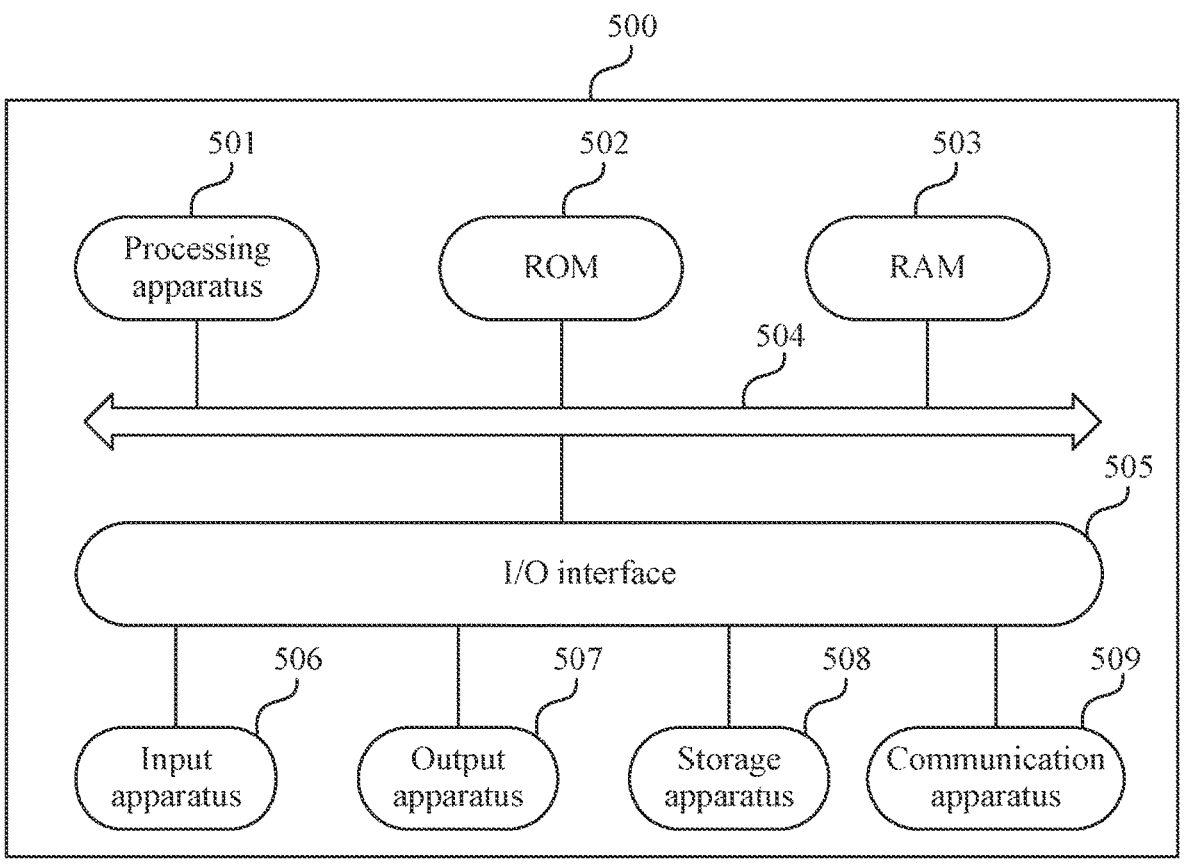
FIG. 12 is a diagram illustrating the structure of an electronic device according to an embodiment of the present disclosure.

FIG. 12 is a diagram illustrating the structure of an electronic device according to an embodiment of the present disclosure. FIG. 12 is a diagram illustrating the structure of an electronic device (for example, a terminal device or server in FIG. 12) 500 for implementing embodiments of the present disclosure. The terminal device of this embodiment of the present disclosure may include, but is not limited to, a mobile terminal such as a mobile phone, a laptop, a digital broadcast receiver, a personal digital assistant (PDA), a portable Android device (PAD), a portable media player (PMP), or an in-vehicle terminal (such as an in-vehicle navigation terminal): or a stationary terminal such as a digital television (TV) or a desktop computer. The electronic device shown in FIG. 12 is an example and is not intended to limit the function and use range of this embodiment of the present disclosure.

As shown in FIG. 12, the electronic device 500 may include a processing apparatus 501 (such as a central processing unit or a graphics processing unit). The processing apparatus 501 may perform various types of appropriate operations and processing according to a program stored in a read-only memory (ROM) 502 or a program loaded from a storage apparatus 508 to a random-access memory (RAM) 503. The RAM 503 also stores various programs and data required for the operation of the electronic device 500. The processing apparatus 501, the ROM 502 and the RAM 503 are connected to each other through a bus 504. An input/output (I/O) interface 505 is also connected to the bus 504.

Generally, the following apparatuses may be connected to the I/O interface 505: an input apparatus 506 such as a touch screen, a touchpad, a keyboard, a mouse, a camera, a microphone, an accelerometer, or a gyroscope: an output apparatus 507 such as a liquid crystal display (LCD), a speaker, or a vibrator: the storage apparatus 508 such as a magnetic tape or a hard disk: and a communication apparatus 509. The communication apparatus 509 may allow the electronic device 500 to perform wireless or wired communication with other devices to exchange data. Although FIG. 12 shows the electronic device 500 having various apparatuses, it is to be understood that not all the apparatuses shown herein need to be implemented or present. Alternatively, more or fewer apparatuses may be implemented or present.

According to embodiments of the present disclosure, the process described above with reference to a flowchart may be implemented as a computer software program. For example, a computer program product is included in embodiments of the present disclosure. The computer program product includes a computer program carried in a non-transitory computer-readable medium. The computer program includes program codes for executing the method shown in the flowchart. In such an embodiment, the computer program may be downloaded from a network and installed through the communication apparatus 509, or may be installed from the storage apparatus 508, or may be installed from the ROM 502. When the computer program is executed by the processing apparatus 501, the preceding functions defined in the method of embodiments of the present disclosure are executed.

Names of messages or information exchanged between apparatuses in embodiments of the present disclosure are illustrative and not to limit the scope of the messages or information.

The electronic device of this embodiment of the present disclosure belongs to the same concept as the image processing methods provided in the preceding embodiments, and for the technical details not described in detail in the embodiment, reference may be made to the preceding embodiments, and the embodiment has the same beneficial effects as the preceding embodiments.

Embodiments of the present disclosure provide a computer storage medium storing a computer program. When the computer program is executed by a processor, image processing methods provided in the preceding embodiments is performed.

It is to be noted that the preceding computer-readable medium in the present disclosure may be a computer-readable signal medium or a computer-readable storage medium or any combination thereof. The computer-readable storage medium may be, but is not limited to, for example, an electronic, magnetic, optical, electromagnetic, infrared or semiconductor system, apparatus or device, or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or used in conjunction with an instruction execution system, apparatus or device. In the present disclosure, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal or any suitable combination thereof. The computer-readable signal medium may further be any computer-readable medium other than the computer-readable storage medium. The computer-readable signal medium may send, propagate, or transmit a program used by or used in conjunction with an instruction execution system, apparatus or device. The program codes included on the computer-readable medium may be transmitted via any appropriate medium which includes, but is not limited to, a wire, an optical cable, a radio frequency (RF) or any appropriate combination thereof.

In some embodiments, clients and servers may communicate using any network protocol currently known or to be developed in the future, such as HyperText Transfer Protocol (HTTP), and may be interconnected with any form or medium of digital data communication (such as a communication network). Examples of the communication network include a local area network (LAN), a wide area network (WAN), an internet (such as the Internet) and a peer-to-peer network (such as an Ad-Hoc network), as well as any network currently known or to be developed in the future.

The computer-readable medium may be included in the electronic device or may exist alone without being assembled into the electronic device.

The computer-readable medium carries one or more programs which, when executed by the electronic device, cause the electronic device to perform the steps described below:

The computer-readable medium carries one or more programs. When the one or more programs are executed by the electronic device, the electronic device performs the following operations: determining a to-be-registered skeleton chain and a preset skeleton chain of a target part in a to-be-processed video frame, where the to-be-registered skeleton chain includes a to-be-registered wrist or ankle skeleton point and a to-be-registered finger or toe skeleton point, and the preset skeleton chain includes a preset wrist or ankle skeleton point and a preset finger or toe skeleton point: determining wrist or ankle state information of the to-be-registered wrist or ankle skeleton point according to first pose information of the to-be-registered wrist or ankle skeleton point and second pose information of the preset wrist or ankle skeleton point, where the wrist or ankle state information includes wrist or ankle rotation information and wrist or ankle pose information; determining finger or toe state information of the to-be-registered finger or toe skeleton point according to the wrist or ankle state information, third pose information of the to-be-registered finger or toe skeleton point, and fourth pose information of the preset finger or toe skeleton point, where the finger or toe state information includes finger or toe rotation information and finger or toe pose information: and displaying the target part in the to-be-processed video frame according to the wrist or ankle state information and the finger or toe state information.

Computer program codes for executing the operations in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. Program codes may be executed entirely on a user computer, executed partly on a user computer, executed as a stand-alone software package, executed partly on a user computer and partly on a remote computer, or executed entirely on a remote computer or a server. In the case related to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show possible architectures, functions and operations of the system, method and computer program product according to multiple embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which performs specified functions or operations or a combination of special-purpose hardware and computer instructions.

The units involved in embodiments of the present disclosure may be implemented by software or hardware. The name of a unit is not intended to limit the unit in a certain circumstance. For example, the skeleton chain determination module may also be described as a "module for acquiring a to-be-registered skeleton chain and a preset skeleton chain".

The functions described above herein may be executed, at least partially, by one or more hardware logic components. For example, without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, a machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof.

According to one or more embodiments of the present disclosure, [example one] provides an image processing method. The method includes determining a to-be-registered skeleton chain and a preset skeleton chain of a target part in a to-be-processed video frame, where the to-be-registered skeleton chain includes a to-be-registered wrist or ankle skeleton point and a to-be-registered finger or toe skeleton point, and the preset skeleton chain includes a preset wrist or ankle skeleton point and a preset finger or toe skeleton point: determining wrist or ankle state information of the to-be-registered wrist or ankle skeleton point according to first pose information of the to-be-registered wrist or ankle skeleton point and second pose information of the preset wrist or ankle skeleton point, where the wrist or ankle state information includes wrist or ankle rotation information and wrist or ankle pose information: determining finger or toe state information of the to-be-registered finger or toe skeleton point according to the wrist or ankle state information, third pose information of the to-be-registered finger or toe skeleton point, and fourth pose information of the preset finger or toe skeleton point, where the finger or toe state information includes finger or toe rotation information and finger or toe pose information: and displaying the target part in the to-be-processed video frame according to the wrist or ankle state information and the finger or toe state information.

According to one or more embodiments of the present disclosure, [example two] provides an image processing method. In the method, what is described below applies.

For example, determining the wrist or ankle state information of the to-be-registered wrist or ankle skeleton point according to the first pose information of the to-be-registered wrist or ankle skeleton point and the second pose information of the preset wrist or ankle skeleton point includes determining first rotation information according to the first pose information of the to-be-registered wrist or ankle skeleton point and third pose information of at least one to-be-registered finger or toe skeleton point directly associated with the to-be-registered wrist or ankle skeleton point: determining second rotation information according to the second pose information of the preset wrist or ankle skeleton point and fourth pose information of at least one preset finger or toe skeleton point directly associated with the preset wrist or ankle skeleton point: and determining the wrist or ankle state information of the to-be-registered wrist or ankle skeleton point according to the first rotation information and the second rotation information.

According to one or more embodiments of the present disclosure, [example three] provides an image processing method. In the method, what is described below applies.

For example, if the at least one to-be-registered finger or toe skeleton point includes a first to-be-registered finger or toe skeleton point and a second to-be-registered finger or toe skeleton point, determining the first rotation information according to the first pose information of the to-be-registered wrist or ankle skeleton point and the third pose information of the at least one to-be-registered finger or toe skeleton point directly associated with the to-be-registered wrist or ankle skeleton point includes determining a first vector according to the first pose information and the pose information of the first to-be-registered finger or toe skeleton point: determining a second vector according to the first pose information and the pose information of the second to-be-registered finger or toe skeleton point: and determining the first rotation information according to the first vector and the second vector.

According to one or more embodiments of the present disclosure, [example four] provides an image processing method. In the method, what is described below applies.

For example, if the at least one preset finger or toe skeleton point includes a first preset finger or toe skeleton point and a second preset finger or toe skeleton point, determining the second rotation information according to the second pose information of the preset wrist or ankle skeleton point and the fourth pose information of the at least one preset finger or toe skeleton point directly associated with the preset wrist or ankle skeleton point includes determining a third vector according to the second pose information and pose information of the first preset finger or toe skeleton point: determining a fourth vector according to the second pose information and pose information of the second preset finger or toe skeleton point: and determining the second rotation information according to the third vector and the fourth vector.

According to one or more embodiments of the present disclosure, [example five] provides an image processing method. In the method, what is described below applies.

For example, determining the wrist or ankle state information of the to-be-registered wrist or ankle skeleton point according to the first rotation information and the second rotation information includes determining an alignment transformation matrix according to the second rotation information and the inverse of the first rotation information: and determining the wrist or ankle state information according to the alignment transformation matrix and the first pose information of the to-be-registered wrist or ankle skeleton point.

According to one or more embodiments of the present disclosure, [example six] provides an image processing method. In the method, what is described below applies.

For example, determining the wrist or ankle pose information in the wrist or ankle state information according to the alignment transformation matrix and the first pose information of the to-be-registered wrist or ankle skeleton point includes determining position information in the wrist or ankle pose information according to position information in the second pose information; and determining posture information in the wrist or ankle pose information according to the alignment transformation matrix and position information in the first pose information.

According to one or more embodiments of the present disclosure, [example seven] provides an image processing method. In the method, what is described below applies.

For example, before determining the finger or toe state information of the to-be-registered finger or toe skeleton point according to the wrist or ankle state information, the third pose information of the to-be-registered finger or toe skeleton point, and the fourth pose information of the preset finger or toe skeleton point, the method also includes retrieving preset first dependency information of the to-be-registered wrist or ankle skeleton point and the to-be-registered finger or toe skeleton point and preset second dependency information of the preset wrist or ankle skeleton point and the preset finger or toe skeleton point, where the first dependency information and the second dependency information each include a finger or toe skeleton point or a wrist or ankle skeleton point on which at least one finger or toe skeleton point in the same branch is directly dependent in a skeleton chain: and determining the processing priority order of to-be-registered finger or toe skeleton points and the processing priority order of preset finger or toe skeleton points according to the first dependency information and the second dependency information to determine finger or toe state information of the to-be-registered finger or toe skeleton points according to the processing priority order.

According to one or more embodiments of the present disclosure, [example eight] provides an image processing method. In the method, what is described below applies.

For example, determining the finger or toe state information of the to-be-registered finger or toe skeleton point according to the wrist or ankle state information, the third pose information of the to-be-registered finger or toe skeleton point, and the fourth pose information of the preset finger or toe skeleton point includes determining at least one finger or toe skeleton point group, where each of the at least one finger or toe skeleton point group includes a preset finger or toe skeleton point and a to-be-registered finger or toe skeleton point that belong to skeleton chain branches corresponding to each other and that have the same processing priority level: for each of the at least one finger or toe skeleton point group, determining a front dependency skeleton point group and a rear dependency skeleton point group of the current finger or toe skeleton point group according to the processing priority level, where the front dependency skeleton point group includes a wrist or ankle skeleton point group or a finger or toe skeleton point group: and in response to determining that the front dependency skeleton point group is the wrist or ankle skeleton point group, determining finger or toe state information of a to-be-registered finger or toe skeleton point in the current finger or toe skeleton point group according to the wrist or ankle rotation information in the wrist or ankle state information, pose information in the current finger or toe skeleton point group, and pose information in the rear dependency skeleton point group.

According to one or more embodiments of the present disclosure, [example nine] provides an image processing method. In the method, what is described below applies.

For example, the method also includes in response to determining that the front dependency skeleton point group is the finger or toe skeleton point group, determining the finger or toe state information of the to-be-registered finger or toe skeleton point in the current finger or toe skeleton point group according to target finger or toe rotation information in finger or toe state information of a to-be-registered skeleton point in the front dependency skeleton point group, the pose information in the current finger or toe skeleton point group, and the pose information in the rear dependency skeleton point group.

According to one or more embodiments of the present disclosure, [example ten] provides an image processing method. In the method, what is described below applies.

For example, determining the finger or toe state information of the to-be-registered finger or toe skeleton point in the current finger or toe skeleton point group according to the target finger or toe rotation information in the finger or toe state information of the to-be-registered skeleton point in the front dependency skeleton point group, the pose information in the current finger or toe skeleton point group, and the pose information in the rear dependency skeleton point group includes determining the current finger or toe rotation information of a to-be-registered skeleton point in the current finger or toe skeleton point group according to the target finger or toe rotation information, third pose information and fourth pose information in the current finger or toe skeleton point group, and third pose information and fourth pose information in the rear dependency skeleton point group: determining the current finger or toe pose information of the to-be-registered skeleton point in the current finger or toe skeleton point group according to the target finger or toe rotation information and the current finger or toe rotation information: and determining finger or toe state information of the to-be-registered skeleton point in the current finger or toe skeleton point group according to the current finger or toe rotation information and the current finger or toe pose information.

According to one or more embodiments of the present disclosure, [example eleven] provides an image processing method. In the method, what is described below applies.

For example, determining the current finger or toe rotation information of the to-be-registered skeleton point in the current finger or toe skeleton point group according to the target finger or toe rotation information, the third pose information and the fourth pose information in the current finger or toe skeleton point group, and the third pose information and the fourth pose information in the rear dependency skeleton point group includes determining a third rotation vector according to the third pose information in the current finger or toe skeleton point group and the third pose information in the rear dependency skeleton point group: determining a fourth rotation vector according to the fourth pose information in the current finger or toe skeleton point group and the fourth pose information in the rear dependency skeleton point group: determining, according to the third rotation vector and the fourth rotation vector, a rotation matrix for rotation from the to-be-registered finger or toe skeleton point in the current finger or toe skeleton point group to a corresponding preset finger or toe skeleton point: and determining the current finger or toe rotation information of the to-be-registered skeleton point in the current finger or toe skeleton point group according to the rotation matrix and the target finger or toe rotation information.

According to one or more embodiments of the present disclosure, [example twelve] provides an image processing method. In the method, what is described below applies.

For example, displaying the target part in the to-be-processed video frame according to the wrist or ankle state information and the finger or toe state information includes adjusting display positions and display postures of multiple skeleton points of the target part in the display interface of the to-be-processed video frame according to the wrist or ankle state information and the finger or toe state information to obtain a target video frame corresponding to the to-be-processed video frame.

According to one or more embodiments of the present disclosure, [example thirteen] provides an image processing method. In the method, what is described below applies.

For example, the method also includes in response to determining that a position offset between the to-be-registered wrist or ankle skeleton point and the preset wrist or ankle skeleton point is greater than a preset offset threshold according to the wrist or ankle state information, determining length information of at least one of an arm skeleton chain or a leg skeleton chain to which the to-be-registered wrist or ankle skeleton point belongs: and adjusting the display position of at least one skeleton point of the at least one of the arm skeleton chain or the leg skeleton chain according to the length information and the position offset.

According to one or more embodiments of the present disclosure, [example fourteen] provides an image processing apparatus. The apparatus includes a skeleton chain determination module, a wrist or ankle determination module, a finger or toe determination module, and a display module.

The skeleton chain determination module is configured to determine a to-be-registered skeleton chain and a preset skeleton chain of a target part in a to-be-processed video frame, where the to-be-registered skeleton chain includes a to-be-registered wrist or ankle skeleton point and a to-be-registered finger or toe skeleton point, and the preset skeleton chain includes a preset wrist or ankle skeleton point and a preset finger or toe skeleton point.

The wrist or ankle determination module is configured to determine wrist or ankle state information of the to-be-registered wrist or ankle skeleton point according to first pose information of the to-be-registered wrist or ankle skeleton point and second pose information of the preset wrist or ankle skeleton point, where the wrist or ankle state information includes wrist or ankle rotation information and wrist or ankle pose information.

The finger or toe determination module is configured to determine finger or toe state information of the to-be-registered finger or toe skeleton point according to the wrist or ankle state information, third pose information of the to-be-registered finger or toe skeleton point, and fourth pose information of the preset finger or toe skeleton point, where the finger or toe state information includes finger or toe rotation information and finger or toe pose information.

The display module is configured to display the target part in the to-be-processed video frame according to the wrist or ankle state information and the finger or toe state information.

Additionally, although the operations are depicted in a particular order, this should not be construed as requiring that such operations should be performed in the particular order shown or in a sequential order. In certain circumstances, multitasking and parallel processing may be advantageous. Similarly, although several specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable sub-combination.

What is claimed is:

1. An image processing method, comprising:

determining a to-be-registered skeleton chain and a preset skeleton chain of a target part in a to-be-processed video frame, wherein the to-be-registered skeleton chain comprises a to-be-registered wrist or ankle skeleton point and at least one to-be-registered finger or toe skeleton point, the preset skeleton chain comprises a preset wrist or ankle skeleton point and at least one preset finger or toe skeleton point, the to-be-registered skeleton chain is an initial to-be-registered skeleton model of the target part, and the reset skeleton chain is a skeleton model into which the to-be-registered skeleton chain of the target is transformed after being registered;

determining wrist or ankle state information of the to-be-registered wrist or ankle skeleton point according to first pose information of the to-be-registered wrist or ankle skeleton point and second pose information of the preset wrist or ankle skeleton point, wherein the wrist or ankle state information comprises wrist or ankle rotation information and wrist or ankle pose information;

determining finger or toe state information of the at least one to-be-registered finger or toe skeleton point according to the wrist or ankle state information, third pose information of the at least one to-be-registered finger or toe skeleton point, and fourth pose information of the at least one preset finger or toe skeleton point, wherein the finger or toe state information comprises finger or toe rotation information and finger or toe pose information; and adjusting display positions and display postures of a plurality of skeleton points of the target part according to the wrist or ankle state information and the finger or toe state information and displaying the target parting the to-be-processed video frame according to the adjusted display positions and the adjusted display postures of the plurality of skeleton points of the target part.

2. The method of claim 1, wherein determining the wrist or ankle state information of the to-be-registered wrist or ankle skeleton point according to the first pose information of the to-be-registered wrist or ankle skeleton point and the second pose information of the preset wrist or ankle skeleton point comprises:

determining first rotation information according to the first pose information of the to-be-registered wrist or ankle skeleton point and third pose information of at least one to-be-registered finger or toe skeleton point directly associated with the to-be-registered wrist or ankle skeleton point;

determining second rotation information according to the second pose information of the preset wrist or ankle skeleton point and fourth pose information of at least one preset finger or toe skeleton point directly associated with the preset wrist or ankle skeleton point; and determining the wrist or ankle state information of the to-be-registered wrist or ankle skeleton point according to the first rotation information and the second rotation information.

3. The method of claim 2, wherein determining the wrist or ankle state information of the to-be-registered wrist or ankle skeleton point according to the first rotation information and the second rotation information comprises:

determining an alignment transformation matrix according to the second rotation information and an inverse of the first rotation information; and determining the wrist or ankle state information according to the alignment transformation matrix and the first pose information of the to-be-registered wrist or ankle skeleton point.

4. The method of claim 3, wherein determining the wrist or ankle state information according to the alignment transformation matrix and the first pose information of the to-be-registered wrist or ankle skeleton point comprises:

determining position information in the wrist or ankle pose information according to position information in the second pose information; and determining posture information in the wrist or ankle pose information according to the alignment transformation matrix and position information in the first pose information.

5. The method of claim 1, before determining the finger or toe state information of the at least one to-be-registered finger or toe skeleton point according to the wrist or ankle state information, the third pose information of the at least one to-be-registered finger or toe skeleton point, and the fourth pose information of the at least one preset finger or toe skeleton point, the method further comprising:

retrieving preset first dependency information of the to-be-registered wrist or ankle skeleton point and the at least one to-be-registered finger or toe skeleton point and preset second dependency information of the preset wrist or ankle skeleton point and the at least one preset finger or toe skeleton point, wherein the first dependency information and the second dependency information each comprise a finger or toe skeleton point or a wrist or ankle skeleton point on which at least one finger or toe skeleton point in a same branch is directly dependent in a skeleton chain; and determining a processing priority order of the at least one to-be-registered finger or toe skeleton point and a processing priority order of the at least one preset finger or toe skeleton point according to the first dependency information and the second dependency information to determine the finger or toe state information of the at least one to-be-registered finger or toe skeleton point according to the processing priority order of the at least one to-be-registered finger or toe skeleton point and the processing priority order of the at least one preset finger or toe skeleton point.

6. The method of claim 5, wherein determining the finger or toe state information of the at least one to-be-registered finger or toe skeleton point according to the wrist or ankle state information, the third pose information of the at least one to-be-registered finger or toe skeleton point, and the fourth pose information of the at least one preset finger or toe skeleton point comprises:

determining at least one finger or toe skeleton point group, wherein each of the at least one finger or toe skeleton point group comprises a preset finger or toe skeleton point and a to-be-registered finger or toe skeleton point that belong to skeleton chain branches corresponding to each other and that have a same processing priority level;

for each of the at least one finger or toe skeleton point group, determining a front dependency skeleton point group and a rear dependency skeleton point group of a current finger or toe skeleton point group according to the processing priority level, wherein the front dependency skeleton point group comprises a wrist or ankle skeleton point group or a finger or toe skeleton point group; and in response to determining that the front dependency skeleton point group is the wrist or ankle skeleton point group, determining finger or toe state information of a to-be-registered finger or toe skeleton point in the current finger or toe skeleton point group according to the wrist or ankle rotation information in the wrist or ankle state information, pose information in the current finger or toe skeleton point group, and pose information in the rear dependency skeleton point group.

7. The method of claim 6, further comprising:

in response to determining that the front dependency skeleton point group is the finger or toe skeleton point group, determining the finger or toe state information of the to-be-registered finger or toe skeleton point in the current finger or toe skeleton point group according to target finger or toe rotation information in finger or toe state information of a to-be-registered skeleton point in the front dependency skeleton point group, the pose information in the current finger or toe skeleton point group, and the pose information in the rear dependency skeleton point group.

8. The method of claim 7, wherein determining the finger or toe state information of the to-be-registered finger or toe skeleton point in the current finger or toe skeleton point group according to the target finger or toe rotation information in the finger or toe state information of the to-be-registered skeleton point in the front dependency skeleton point group, the pose information in the current finger or toe skeleton point group, and the pose information in the rear dependency skeleton point group comprises:

determining current finger or toe rotation information of a to-be-registered skeleton point in the current finger or toe skeleton point group according to the target finger or toe rotation information, third pose information and fourth pose information in the current finger or toe skeleton point group, and third pose information and fourth pose information in the rear dependency skeleton point group;

determining current finger or toe pose information of the to-be-registered skeleton point in the current finger or toe skeleton point group according to the target finger or toe rotation information and the current finger or toe rotation information; and determining the finger or toe state information of the to-be-registered finger or toe skeleton point in the current finger or toe skeleton point group according to the current finger or toe rotation information and the current finger or toe pose information.

9. The method of claim 8, wherein determining the current finger or toe rotation information of the to-be-registered skeleton point in the current finger or toe skeleton point group according to the target finger or toe rotation information, the third pose information and the fourth pose information in the current finger or toe skeleton point group, and the third pose information and the fourth pose information in the rear dependency skeleton point group comprises:

determining a third rotation vector according to the third pose information in the current finger or toe skeleton point group and the third pose information in the rear dependency skeleton point group;

determining a fourth rotation vector according to the fourth pose information in the current finger or toe skeleton point group and the fourth pose information in the rear dependency skeleton point group;

determining, according to the third rotation vector and the fourth rotation vector, a rotation matrix for rotation from the to-be-registered finger or toe skeleton point in the current finger or toe skeleton point group to a corresponding preset finger or toe skeleton point; and determining the current finger or toe rotation information of the to-be-registered skeleton point in the current finger or toe skeleton point group according to the rotation matrix and the target finger or toe rotation information.

10. The method of claim 1, further comprising:

in response to determining that a position offset between the to-be-registered wrist or ankle skeleton point and the preset wrist or ankle skeleton point is greater than a preset offset threshold according to the wrist or ankle state information, determining length information of at least one of an arm skeleton chain or a leg skeleton chain to which the to-be-registered wrist or ankle skeleton point belongs; and adjusting a display position of at least one skeleton point of the at least one of the arm skeleton chain or the leg skeleton chain according to the length information and the position offset.

11. An electronic device, comprising:

one or more processors; and a storage apparatus configured to store one or more programs, wherein the one or more programs are configured to, when executed by the one or more programs, cause the one or more processors to perform the following steps:

determining a to-be-registered skeleton chain and a preset skeleton chain of a target part in a to-be-processed video frame, wherein the to-be-registered skeleton chain comprises a to-be-registered wrist or ankle skeleton point and at least one to-be-registered finger or toe skeleton point, the preset skeleton chain comprises a preset wrist or ankle skeleton point and at least one preset finger or toe skeleton point, the registered skeleton chain is an initial to-be-registered skeleton model of the target part, and the present skeleton chain is a skeleton model into which the to-be-registered skeleton chain of the target part is transformed after being registered;

determining wrist or ankle state information of the to-be-registered wrist or ankle skeleton point according to first pose information of the to-be-registered wrist or ankle skeleton point and second pose information of the preset wrist or ankle skeleton point, wherein the wrist or ankle state information comprises wrist or ankle rotation information and wrist or ankle pose information;

determining finger or toe state information of the at least one to-be-registered finger or toe skeleton point according to the wrist or ankle state information, third pose information of the at least one to-be-registered finger or toe skeleton point, and fourth pose information of the at least one preset finger or toe skeleton point, wherein the finger or toe state information comprises finger or toe rotation information and finger or toe pose information; and adjusting display positions and display postures of a plurality of skeleton points of the target part according to the wrist or ankle state information and the finger or toe state information and displaying the target part in the to-be-processed video frame according to the adjusted display positions and the adjusted display postures of the plurality of skeleton points of the target part.

12. A non-transitory storage medium storing computer-executable instructions, wherein the computer-executable instructions, when executed by a computer processor, cause the computer processor to perform the following steps:

determining a to-be-registered skeleton chain and a preset skeleton chain of a target part in a to-be-processed video frame, wherein the to-be-registered skeleton chain comprises a to-be-registered wrist or ankle skeleton point and at least one to-be-registered finger or toe skeleton point, the preset skeleton chain comprises a preset wrist or ankle skeleton point and at least one preset finger or toe skeleton point, the to-be registered chain is an initial to-be-registered skeleton model of the target part, and the preset skeleton chain is a skeleton model into which the to-be-registered skeleton chain of the target part is transformed after being registered;

determining wrist or ankle state information of the to-be-registered wrist or ankle skeleton point according to first pose information of the to-be-registered wrist or ankle skeleton point and second pose information of the preset wrist or ankle skeleton point, wherein the wrist or ankle state information comprises wrist or ankle rotation information and wrist or ankle pose information;

determining finger or toe state information of the at least one to-be-registered finger or toe skeleton point according to the wrist or ankle state information, third pose information of the at least one to-be-registered finger or toe skeleton point, and fourth pose information of the at least one preset finger or toe skeleton point, wherein the finger or toe state information comprises finger or toe rotation information and finger or toe pose information; and adjusting display positions and display postures of a plurality of skeleton points of the target part according to the wrist or ankle state information and the finger or toe state information and displaying the target part in the to-be-processed video frame according to the adjusted display positions and the adjusted display postures of the plurality of skeleton points of the target part.

13. The device of claim 11, wherein determining the wrist or ankle state information of the to-be-registered wrist or ankle skeleton point according to the first pose information of the to-be-registered wrist or ankle skeleton point and the second pose information of the preset wrist or ankle skeleton point comprises:

determining first rotation information according to the first pose information of the to-be-registered wrist or ankle skeleton point and third pose information of at least one to-be-registered finger or toe skeleton point directly associated with the to-be-registered wrist or ankle skeleton point;

determining second rotation information according to the second pose information of the preset wrist or ankle skeleton point and fourth pose information of at least one preset finger or toe skeleton point directly associated with the preset wrist or ankle skeleton point; and determining the wrist or ankle state information of the to-be-registered wrist or ankle skeleton point according to the first rotation information and the second rotation information.

14. The device of claim 13, wherein determining the wrist or ankle state information of the to-be-registered wrist or ankle skeleton point according to the first rotation information and the second rotation information comprises:

determining an alignment transformation matrix according to the second rotation information and an inverse of the first rotation information; and determining the wrist or ankle state information according to the alignment transformation matrix and the first pose information of the to-be-registered wrist or ankle skeleton point.

15. The device of claim 14, wherein determining the wrist or ankle state information according to the alignment transformation matrix and the first pose information of the to-be-registered wrist or ankle skeleton point comprises:

determining position information in the wrist or ankle pose information according to position information in the second pose information; and determining posture information in the wrist or ankle pose information according to the alignment transformation matrix and position information in the first pose information.

16. The device of claim 11, wherein the one or more programs are configured to, when executed by the one or more programs, further cause the one or more processors to perform, before determining the finger or toe state information of the at least one to-be-registered finger or toe skeleton point according to the wrist or ankle state information, the third pose information of the at least one to-be-registered finger or toe skeleton point, and the fourth pose information of the at least one preset finger or toe skeleton point, the following steps:

retrieving preset first dependency information of the to-be-registered wrist or ankle skeleton point and the at least one to-be-registered finger or toe skeleton point and preset second dependency information of the preset wrist or ankle skeleton point and the at least one preset finger or toe skeleton point, wherein the first dependency information and the second dependency information each comprise a finger or toe skeleton point or a wrist or ankle skeleton point on which at least one finger or toe skeleton point in a same branch is directly dependent in a skeleton chain; and determining a processing priority order of the at least one to-be-registered finger or toe skeleton point and a processing priority order of the at least one preset finger or toe skeleton point according to the first dependency information and the second dependency information to determine the finger or toe state information of the at least one to-be-registered finger or toe skeleton point according to the processing priority order of the at least one to-be-registered finger or toe skeleton point and the processing priority order of the at least one preset finger or toe skeleton point.

17. The device of claim 16, wherein determining the finger or toe state information of the at least one to-be-registered finger or toe skeleton point according to the wrist or ankle state information, the third pose information of the at least one to-be-registered finger or toe skeleton point, and the fourth pose information of the at least one preset finger or toe skeleton point comprises:

determining at least one finger or toe skeleton point group, wherein each of the at least one finger or toe skeleton point group comprises a preset finger or toe skeleton point and a to-be-registered finger or toe skeleton point that belong to skeleton chain branches corresponding to each other and that have a same processing priority level;

for each of the at least one finger or toe skeleton point group, determining a front dependency skeleton point group and a rear dependency skeleton point group of a current finger or toe skeleton point group according to the processing priority level, wherein the front dependency skeleton point group comprises a wrist or ankle skeleton point group or a finger or toe skeleton point group; and in response to determining that the front dependency skeleton point group is the wrist or ankle skeleton point group, determining finger or toe state information of a to-be-registered finger or toe skeleton point in the current finger or toe skeleton point group according to the wrist or ankle rotation information in the wrist or ankle state information, pose information in the current finger or toe skeleton point group, and pose information in the rear dependency skeleton point group.

18. The device of claim 17, wherein the one or more programs are configured to, when executed by the one or more programs, further cause the one or more processors to perform the following steps:

in response to determining that the front dependency skeleton point group is the finger or toe skeleton point group, determining the finger or toe state information of the to-be-registered finger or toe skeleton point in the current finger or toe skeleton point group according to target finger or toe rotation information in finger or toe state information of a to-be-registered skeleton point in the front dependency skeleton point group, the pose information in the current finger or toe skeleton point group, and the pose information in the rear dependency skeleton point group.

19. The device of claim 18, wherein determining the finger or toe state information of the to-be-registered finger or toe skeleton point in the current finger or toe skeleton point group according to the target finger or toe rotation information in the finger or toe state information of the to-be-registered skeleton point in the front dependency skeleton point group, the pose information in the current finger or toe skeleton point group, and the pose information in the rear dependency skeleton point group comprises:

determining current finger or toe rotation information of a to-be-registered skeleton point in the current finger or toe skeleton point group according to the target finger or toe rotation information, third pose information and fourth pose information in the current finger or toe skeleton point group, and third pose information and fourth pose information in the rear dependency skeleton point group;

determining current finger or toe pose information of the to-be-registered skeleton point in the current finger or toe skeleton point group according to the target finger or toe rotation information and the current finger or toe rotation information; and determining the finger or toe state information of the to-be-registered finger or toe skeleton point in the current finger or toe skeleton point group according to the current finger or toe rotation information and the current finger or toe pose information.

* * * * *